United States Patent
Bellora et al.

(10) Patent No.: US 6,907,391 B2
(45) Date of Patent: Jun. 14, 2005

(54) METHOD FOR IMPROVING THE ENERGY ABSORBING CHARACTERISTICS OF AUTOMOBILE COMPONENTS

(75) Inventors: Val A. Bellora, Holland, MI (US); Ryan W. Krauss, Grand Rapids, MI (US); Martin Lambrecht, Holland, MI (US); Lambert J. Van Poolen, Grand Rapids, MI (US); Paul E. Thoma, Cedarburg, WI (US)

(73) Assignee: Johnson Controls Technology Company, Holland, MI (US)

( * ) Notice: Subject to any disclaimer, the term of this patent is extended or adjusted under 35 U.S.C. 154(b) by 834 days.

(21) Appl. No.: 09/797,925

(22) Filed: Mar. 2, 2001

(65) Prior Publication Data

US 2002/0013686 A1 Jan. 31, 2002

Related U.S. Application Data

(60) Provisional application No. 60/187,188, filed on Mar. 6, 2000.

(51) Int. Cl.[7] .............................................. G06G 7/48
(52) U.S. Cl. ........................ 703/8; 703/2; 703/6; 703/7; 706/45; 296/187.05; 296/210
(58) Field of Search ........................ 703/8, 7, 6; 706/45

(56) References Cited

U.S. PATENT DOCUMENTS

| | | | |
|---|---|---|---|
| 2,275,575 A | | 3/1942 | Vrooman |
| 2,714,570 A | | 8/1955 | Brown |
| 3,231,454 A | | 1/1966 | Williams |
| 3,632,132 A | * | 1/1972 | Richardson .............. 280/728.1 |
| 3,744,627 A | | 7/1973 | Rope et al. |
| 3,769,145 A | | 10/1973 | Gresham et al. |
| 4,422,194 A | | 12/1983 | Viesturs et al. |
| 4,869,939 A | | 9/1989 | Santo |
| 5,030,501 A | | 7/1991 | Colvin et al. |
| 5,052,161 A | | 10/1991 | Whitacre |
| 5,189,018 A | * | 2/1993 | Goldman et al. ............. 514/10 |
| 5,340,059 A | * | 8/1994 | Kanigowski ................. 244/121 |
| 5,389,316 A | * | 2/1995 | Kerman ..................... 264/46.5 |
| 5,399,406 A | | 3/1995 | Matsuo et al. |
| 5,460,867 A | | 10/1995 | Magnuson et al. |
| 5,518,802 A | | 5/1996 | Colvin et al. |
| 5,580,651 A | * | 12/1996 | Kerman ................... 428/318.4 |
| 5,599,606 A | | 2/1997 | Disselbeck et al. |
| 5,619,832 A | | 4/1997 | Myrvold |
| 6,017,084 A | | 1/2000 | Carroll, III et al. |
| 6,179,326 B1 | * | 1/2001 | Breed et al. ................. 280/735 |
| 6,199,942 B1 | | 3/2001 | Carroll, III et al. |
| 6,247,745 B1 | | 6/2001 | Carroll, III et al. |
| 6,264,238 B1 | * | 7/2001 | MacDonald et al. ........ 280/751 |
| 6,477,517 B1 | * | 11/2002 | Limaiem et al. .............. 706/45 |
| 6,679,967 B1 | * | 1/2004 | Carroll et al. .............. 156/222 |

OTHER PUBLICATIONS

Hardy et al., "Ongoing Investigation of Brain–Injury Kinematics", 24th International Workshop on Human Subjects for Biomechanical Research, pp. 93–105.*

Melvin et al., "Biomechanical Analysis of Indy Race Car Crashes", 1998 Society of Automotive Engineers, Inc., No. 983161, pp. 247–266.*

(Continued)

Primary Examiner—Kevin J. Teska
Assistant Examiner—Fred Ferris
(74) Attorney, Agent, or Firm—Foley & Lardner LLP

(57) ABSTRACT

A method is disclosed for designing an energy-absorbing impact zone for a vehicle interior, including acquiring test data representative of an occupant, determining a force versus deflection curve for the vehicle impact zone, analyzing the force versus deflection curve, and utilizing the analysis to adjust the stiffness of the energy-absorbing impact zone and to shape the force versus deflection curve so that a constant area under the force versus deflection curve has the minimum deflection possible without exceeding a certain force limit and a certain head impact criterion.

57 Claims, 16 Drawing Sheets

OTHER PUBLICATIONS

Garret, "Head Impact Modelling Using Computer Accident Simulation Based on Cadaver Records", 1996 24$^{th}$ International Workshop on Human Subjects for Biomechanical Research, pp. 81–92.*

Sugita et al., "A Finite Element Analysis and Optimization of Energy Absorbing Structures in Head Impact", IBEC '95 • Automotive Body Interior & Safety Systems, pp. 55–62.*

Locke et al., "Feasibility Analysis of Engineering Thermoplastics for Head Impact Requirements", IBEC '95 • Automotive Body Interior & Safety Systems, pp. 63–67.*

Sherman et al., "Feasibility Analysis of Engineering Thermoplastics Using High Strain–Rate Material Data for Head Impact Requirements", IBEC '95 —Automotive Body Interior & Safety Systems, pp. 68–74.

Bastawros et al., "Inherent Benefits of Steel for Automobile Crashworthiness: An Overview", IBEC '95 • Automotive Body Interior & Safety Systems, pp. 80–87.

Bendjellal et al., "Measurement of Head Angular Acceleration in Crash Tests: Development of an Electronic Device for the Hybrid III Dummy", joint research study (Renault, Volvo, Endevco), No. 922511, pp. 13–28.

Anderson, et al., "Method to Predict the Energy Absorption Rate Characteristics for a Structural Member", 1998 Society of Automotive Engineers, Inc., No. 982388, pp. 155–162.

Niederer et al., "Occupant Safety of Low–Mass Rigid–Belt Vehicles", University of Zurich and Swiss Federal Institute of Technology and Winterthur Insurance Co., No. 933107, pp. 1–12.

Roberts et al., "The Relationship Between Delta V and Injury", 37$^{th}$ Stapp Car Crash Conference Proceedings, No. 933111, pp. 35–41.

McIntosh et al., "Head and Neck Injury Resulting from Low Velocity Direct Impact", 37$^{th}$ Stapp Car Crash Conference Proceedings, No. 933112, pp. 43–57.

Ruan et al., "Finite Element Modeling of Direct Head Impact", 37$^{th}$ Stapp Car.Crash Conference Proceedings, No. 933114, pp. 69–81.

Keith Seyer, "Development of a New Australian Design Rule for Frontal Impact Protection", Australian Federal Office of Road Safety, No. 933177, pp. 105–120.

Ishikawa et al., "Computer Simulation of Impact Response of the Human Body in Car–Pedestrian Accidents", Japan Automobile Research Institute, Inc., No. 933129, pp. 235–248.

Arimoto et al, "A Study on Energy–Absorbing Mechanism of Plastic Ribs", 1998 Society of Automotive Engineers, Inc., No. 982346, pp. 81–90.

Rychlewski et al., "A General Discussion on Interior Alternatives in Response to FMVSS 201U–Upper Interior Head Impact Protection", 1998 Society of Automotive Engineers, Inc., No. 982348 pp. 91–95.

Naick et al., "Theoretical Relationship of HIC_d to Crush Space for FMVSS–201 Head Impact Tests, and the Effective Use of FEA in Predicting HIC for Design, Verification and Optimization of Countermeasures", 1998 Society of Automotive Engineers, Inc., No. 982349, pp. 97–105.

Sun et al., "Structural Bifuraction of Side Members in Vehicle Frontal Impact", 1998 Society of Automotive Engineers, Inc., No. 982355, pp. 113–119.

Perry et al., "Polyurethane Safety Foam Performance Map for Material Selection and Design in Vehicle and Occupant Impact Protection", No. 980966, pp. 57–64.

Vlano et al, "The Viscous Criterion", General Motors Research Members.

Fialka et al., "A Comparative Study of Energy Absorbing Foams for Head Impact Energy Management", 1998 Society of Automotive Engineers, Inc., No. 980972, pp. 93–95.

Traugott et al., "New Ductile, Heat Resistant, ABS Resin for Energy Management Applications", 1998 Society of Automotive Engineers, Inc., No. 980969, pp. 79–84.

Glance, et al., "Inflatable Padding for Hard Surfaces in Vehicle Interiors", Concept Analysis Corporation, Mar. 15, 1991.

Amori et al., "Influence of System Variables on Interior Head Impact Testing", 1995 Society of Automotive Engineers, Inc., No. 950882, pp. 1–13.

Locke et al., "Energy–Absorbing Thermoplastics for Head Impact Applications", 1996 Society of Automotive Engineers, Inc., No. 960154, pp. 1–5.

N. J. Mills, "Role of Components of Motorcycle Helmets", School of Metallurgy and Materials University of Birmingham, B15 2TT, U.K., pp. 1–5.

Author unknown, "Playground Surfacing Materials", U.S. Consumer Product Safety Commission, pp. 1–7.

Author unknown, "Standard Specification for Impact Attenuation of Surface Systems Under and Around Playground Equipment", American Society for Testing and Materials, F 1292–96, pp. 1–9.

Lorenzi, et al., "Aluminum Foam Applications for Impact Energy Absorbing Structures", 1997 Society of Automotive Engineers, Inc., No. 970015, pp. 23–32.

Belingardi et al., "Crushing Beaviour of Aluminum Circular Tubes", Mechanical Engineering Department, Politecnico di Torino—Italy, No. 94A2016, pp. 137–144.

Werner Goldsmith, "Meaningful Concepts of Head Injury Criteria", Department of Mechanical Engineering, University of California, Berkeley, CA, pp. 1–11.

Stalnaker et al., "Translational Energy Criteria and Its Correlation with Head Injury in the Sub–Human Primate", NHTSA's Vechicle Research and Test Center, pp. 223–237.

Marguiles et al., "A Study of Scaling and Head Injury Criteria Using Physical Model Experiments", University of Pennsylvania, pp. 223–234.

P.L. Harms, "A Study of Motorcyclist Casualties with Particular Reference to Head Injuries", Transport and Road Research Laboratory, Crowthorne Berkshire, England, pp. 91–97.

George G. Snively, MD, "Head Protection: Preventive Medicine in Traffic Safety", Snell Memorial Foundation And School of Medicine, University of California, Davis, pp. 69–80.

Roberts et al., "Review of Head Injury Tolerance to Direct Impact", Highway Safety Research Institute, The University of Michigan, Ann Arbor, MI, pp. 241–257.

Advani et al., "Human Head Impact Response Experimental Data and Analytical Simulations", Department of Mechanical Engineering and Mechanics, West Virginia University, Morgantown, WV, pp. 153–163.

Van Gowdy, "Evaluation of the Instrumented Ball Impact Procedure to Assess Head Impact Protection in Airplanes", 1995 Society of Automotive Engineers, Inc., No. 951166, pp. 1–7.

McIntosh et al., "An Evaluation of Pedal Cycle Helmet Performance Requirements", 1995 Society of Automotive Engineers, Inc., No. 952713, pp. 111–119.

Stalnaker et al., "The Translational Energy Criteria: A Validation Study for Non–Fracture Head Impacts", 1997 Society of Automotive Engineers, Inc., No. 973337 pp. 301–314.

Sounik et al., "Head–Impact Testing of Polyurethane Energy–Absorbing (EA) Foams", 1997 Society of Automotive Engineers, Inc., No. 970160, pp. 1–9.

Gandhe et al., "Design Development of Energy Absorbing Ribs for Meeting FMVSS 201 Extended Head Impact", 1997 Society of Automotive Engineers, Inc., No. 970161, pp. 35–44.

Gandhe et al., "A Statistical Approach to Design Trim Pillars for FMVSS Extended Head Impact" 1997 Society of Automotive Engineers, Inc., No. 970162, pp. 45–54.

Fuganti et al., "Crashworthiness Improvement by Aluminum Foam Lightweight Structures", Centro Research Fiat, No. 97A2III26, pp. 261–273.

John H. Porter, "Utilizing the Crushing Under Load Properties of Polypropylene and Polyethylene Honeycomb To Manage Crash Energy", 1994 Society of Automotive Engineers, Inc., No. 940877, pp. 1–8.

Ziernicki et al., "Head Injury in Automobile Accidents", 1995 Society of Automotive Engineers, Inc., No. 9442377, pp. 1–8.

Syrowik et al., "Energy–Absorbing Polyurethane Foam to Improve Vehicle Crashworthiness", 1995 Society of Automotive Engineers, Inc., No. 950553, pp. 1–10.

Walfisch et al., "Human Head Tolerance to Impact: Influence of the Jerk (Rate of Onset of Linear Acceleration) on the Occurence of Brain Injuries", pp. 286–296.

Gustafson et al., "On the Calculation of Head Impact Motion Using Experimental Data", Department of Mechanical Engineering, University of Lulea, Lulea Sweden, pp. 225–234.

Rojanavanich et al., "Sensitivity Analysis for the Translational Energy Criteria: Overall Head Injuries", The Ohio State University, pp. 13–25.

Kramer et al., "Evaluation of Protection Criteria on the Basis of Statistical Biomechanics", Institut für Fahrzeugtechnik Technische Universität Berlin, Berlin, Fed. Rep. Of Germany, pp. 45–57.

Mitsuishi et al., "Present and Future Performance Levels of Head Injury Protection for Motorcycle Helmets", pp. 259–270.

Auer et al., "Intracranial Injuries of Fatally Injured Pedestrians—A Contribution to the Establishment of Tolerance Limits", Institut für Rechtsmedizin der Universität Müchen, pp. 247–257.

Meaney et al., "Rotational Brain Injury Tolerance Criteria as a Function of Vehicle Crash Parameters", Depts. of Bioengineering and Neurosurgery, University of Pennsylvania, Philadelphia, PA, pp. 51–62.

Beusenberg et al., "An Experimental Evaluation of Crash Helmet Design and Effectiveness in Standard Impact Tests", International IRCOBI Conference on the Biomechanics of Impacts, Sep. 8–10, 1993, pp. 307–323.

Digges et al., "Head Protection Offered by Automobile Sun Visors", 36$^{th}$ Annual Proceedings Association for the Advancement of Automotive Medicine, Oct. 5–7, 1992, pp. 131–147.

Kasai et al., "Examples of Evaluation Methods of Energy Absorbing Properties for Interior Occupant Protection" pp. 12–16.

Kasai et al., "Examples of Evaluation Methods of Energy Absorbing Properties for Upper Interior Head Protection", Isuzu Motors Limited, Japan, Paper No. 96–S8–O–10, pp. 1335–1341.

Schuller et al., "Criteria for Head Impact Protection by Motorcycle Helmets", Institute for Legal Medicine, University of Munich, pp. 283–294.

Stalnaker et al., "A Practical Application of the Translational Energy Criteria: Evaluation of Baseball and Softball Head Impact Injury Potentials", Ohio State University, Columbus, OH, pp. 225–243.

Nusholtz et al., "UMTRI Experimental Techniques in Head Injury Research", 1985 Society of Automotive Engineering, Inc,. No. 851244, pp. 1–9.

Khalil et al., "Critical Issues in Finite Element Modeling of Head Impact", General Motors Research Laboratories, No. 821150, pp. 87–102.

Ward et al., "Intracranial Pressure—A Brain Injury Criterion", 1981 Society of Automotive Engineers, Inc., No. 801304, pp. 3867–3880.

James A. Newman, "The Influence of Time Duration as a Failure Criterion in Helmet Evaluation", 1982 Society Of Automotive Engineers, Inc., No. 821088, pp. 1–7.

Seong et al., "A Study of the Structure for the Head Protection in Crash or Roll–Over of a Vehicle", 1999 Society of Automotive Engineers, Inc., No. 1999–01–0077, pp. 97–102.

Husted et al., "The Appropriate User of "Delta–V" in Describing Accident Severity", 1999 Society of Automotive Engineers, Inc., No. 1999–01–1295, pp. 1–11.

Timothy J. Long, "A Validation Study for the Force Balance Method in Determination of Stiffness Coefficients", 1999 Society of Automotive Engineers, Inc., No. 1999–01–0079, pp. 1–12.

Darvish et al., "A Nonlinear Viscoelastic Model for Polyurethane Foams", 1999 Society of Automotive Engineers, Inc., No. 1999–01–0299, pp. 23–29.

Pádraig Naughton, "Extension of Material Models and Finite Element Techniques to Improve the Simulation of High Speed Impact of Thermoplastic Materials", 1999 Society of Automotive Engineers, Inc., No. 1999–01–0300, pp. 31–35.

P. Feillard, "Crash Modelling of Automotive Structural Parts Made of Composite Materials", 1999 Society of Automotive Engineers, Inc., No. 1999–01–0298, pp. 13–21.

Kamarajan et al., "Effects of Multiple Impacts on Head Injury Criteria", 1999 Society of Automotive Engineers, Inc., No. 1999–01–0297, pp. 5–11.

Gandhe et al., "High Efficiency Energy Absorption Olefinic Foam", 1999 Society of Automotive Engineers, Inc., No. 1999–01–0296, pp. 1–4.

Miller et al., "Upper Interior Impact: Test Equipment and Testing Techniques" MGA Research Corporation, US, No. 96–S8–W–16, pp. 1–7.

Laabs et al., "The Fast Path System: Simplifying the Task of Identifying Successful Material/Design Combinations for Efficient Energy Management for Automotive Head Impact Requirements" 1998 Society of Automotive Engineers, Inc., No. 980970, pp. 85–92.

Advani et al., "Evaluation of Head Injury Criteria", 1974 Society of Automotive Engineers, Inc., No. 740083, pp. 1–11.

Miller et al., "Free Motion Headform Testing: Results and Potential Design Countermeasures", MGA Research Corporation, US., No. 96–58–0–06, pp. 1–11.

Rossio et al., "Polyurethane Energy Absorbing Foams for Automotive Applications", 1993 Society of Automotive Engineers, Inc., No. 930433, pp. 1–10.

James A. Newman, "On the Use of the Head Injury Criterion (HIC) in Protective Headgear Evaluation", 1975 Society of Automotive Engineers, Inc., No. 751162, pp. 615–640.

Hirsch et al., "Protection from Brain Injury: The Relative Significance of Translational and Rotational Motions of the Head after Impact", No. 700899, pp. 144–151.

Nabih M. Alem, "Simulation of Head Injury Due to Combined Rotation and Translation of the Brain", Highway Safety Research Institute, The University of Michigan, No. 741192, pp. 3826–3835.

Césari et al., "Evaluation of Human Tolerance in Frontal Impact", 1980 Society of Automotive Engineers, Inc., No. 791032, pp. 3610–3631.

Magee et al., "Design Considerations in Energy Absorption by Structural Collapse", 1978 Society of Automotive Engineers, Inc., No. 780434, pp. 1–15.

Chou et al., "A Review and Evaluation of Various HIC Algorithms", 1988 Society of Automotive Engineers, Inc., No. 880656, pp. 1–35.

James M. Lorenzo, FMVSS201. "A Pillar Impact Simulation and Verification Study", 1999 Society of Automotive Engineers, Inc., No. 1999–01–0433, pp. 51–56.

Fayon et al., "Contribution to Defining a Tolerance Level for a Laterally Impacted Human Head", Experimental Safety Vehicles, pp. 690–703.

Ono et al., "Human Head Tolerance to Sagittal Impact Reliable Estimation Deduced from Experimental Head Injury Using Subhuman Primates and Human Cadaver Skulls", 1980 Society of Automotive Engineers, Inc., No. 801303, pp. 103–160.

Walfisch et al., "Head Risks in Frontal Impacts: Similarities and Difference Between Tests and Real–Life Situations", NHTSA, SAE No. 896067, pp. 563–569.

James A. Newman, "Head Injury in Criteria in Automotive Crash Testing", 1981 Society of Automotive Engineers, Inc., No. 801317, pp. 4098–4115.

Walsh et al., "Head and Neck Injuries in Human Cadavers from Lateral Impacts", NHTSA, SAE, No. 856032, pp. 186–198.

Ullrich et al., "Comparison of Energy Management Materials for Head Impact Protection", 1997 Society of Automotive Engineers, Inc., No. 970159, pp. 11–33.

Nusholtz et al., "Use of a Kalman Filter to Improve the Estimation of ATD Response During Impact", 1999 Society of Automotive Engineers, Inc., No. 1999–01–0707, pp. 59–64.

Padmanabhan et al., "Head Impact Simulations: Stochastic Analysis, Model Validation and Design Improvement", ST–ORM Seminar, Jun. 28, 1999.

McIntosh et al., "A Field and Laboratory Study of the Performance of Pedal Cycle Helmets in Real Accidents", Road Safety Bureau Crash Lab, RTA, NSW, Australia, pp. 51–60.

Bartosiak et al., "The Use of Expanded Bead Foam Materials for Improved Safety in Automotive Interior Components", 1989 Society of Automotive Engineers, Inc., No. 890590, pp. 83–92.

Paul E. Thoma, "Superplasticity and Superplastic Alloys", Johnson Service Co., Research Brief No. 149, May 30, 1974, pp. 1–13.

Chocron–Benloulo et al., "Bullet Proof Vests—Construction & How They Work", Textile Research Journal, V.67, Jul. 1997, pp. 520–528.

Tammy S. Cummings., "Structure and Energy Absorbing Properties of CorteX", Department of Science and Mechanics, Michigan State University, 1999.

Donald T. Willke, "Upper Interior Head Protection, Volume I: The Development of a Research Test Procedure" NHTSA, VRTC–89–0140, Nov. 1991, pp. i–vii, 1–67.

Donald T. Willke, "Upper Interior Head Protection, Volume II: Fleet Characterization and Countermeasure Evaluation" NHTSA, VRTC–89–0140, Nov., 1991, pp. i–vii, 1–41.

Dr. Michael Henderson, "The Effectiveness of Bicycle Helmets: A Review", Bicycle Helmet Safety Institute, 1995, pp. 1–41.

DiMasi et al., "Computational Analysis of Head Impact Response Under Car Crash Loadings", 1995 Society of Automotive Engineers, Inc., No. 952718, pp. 425–438.

Chou et al., "Development of Foam Models as Applications to Vehicles Interior", 1995 Society of Automotive Engineers, Inc., No. 952733, pp. 335–348.

Dietmar Otte, "A Review of Different Kinematic Forms in Two–Wheel–Accidents—Their Influence on Effectiveness of Protective Measures", 1981 Society of Automotive Engineers, Inc., No. 801314, pp. 4031–4051.

Sances, Jr. et al., "The Evoked Potential: An Experimental Method for Biomechanical Analysis of Brain and Spinal Injury", 1981 Society of Automotive Engineers, Inc., No. 801302, pp. 3815–3836.

Nahum et al., "Experimental Studies of Side Impact to the Human Head", 1981 Society of Automotive Engineers, Inc., No. 801301, pp. 3806–3814.

Hodgson et al., "Mechanisms of Cervical Spine Injury During Impact to the Protected Head", 1981 Society of Automotive Engineers, Inc., No. 801300, pp. 3792–3805.

Martin Lambrecht, "Summary Report of 1999 SAE International Congress and Exposition", Mar. 8, 1999, pp. 1–5.

Perry et al., "Biodynamic Testing of Helmet Mounted Systems", Proceedings of the Human Factors and Ergonomics Society $37^{th}$ Annual Meeting, 1993, pp. 79–83.

Saczalski et al., "Multi–Variable Effects of Side Impact Passive Occupant Protection Materials,", 1988 Society of Automotive Engineers, Inc., No. 880397, pp. 41–53.

Chandler et al., "Motorcycle Helmet Load Spreading Performance for Impacts into Rigid and Deformable Objects", pp. 249–261.

Gilchrist et al., "Protection of the Side of the Head", pp. 81–94.

Michael Kerman, "Dynamic Force Deflection Curves of Cellular Plastics Versus Impact Head Shapes", 1996 Society of Automotive Engineers, Inc., No. 960158, pp. 1–4, plus FIGs.

Patric James, "A Technical Thermoplastic Expandable Foam", G.E. Plastics, 97A2III24, p. 249.

Lyon et al., "Theory and Application of Statistical Energy Analysis", Engineering Applications, pp. 153–180.

M.F. Ashby, "The Mechanical Properties of Cellular Solids", Metallurgical Transactions A, vol. 14A, Sep. 1983, pp. 1755–1769.

Yu et al., "Metal Foam bya Powder Metallugy Method", Sep., 1998, pp. 181–188.

Sugimara et al., "On the Mechanical Performance of Closed Cell Al Alloy Foams"Mar., 1997.

* cited by examiner

METHOD FOR IMPROVING THE ENERGY ABSORBING CHARACTERISTICS OF AUTOMOBILE COMPONENTS

CROSS-REFERENCE TO RELATED APPLICATIONS

The following U.S. patent application is cross-referenced and hereby incorporated by reference herein: co-pending U.S. provisional patent application Ser. No. 60/187,188 titled "METHOD AND APPARATUS FOR IMPROVING THE ENERGY ABSORBING CHARACTERISTICS OF AUTOMOBILE COMPONENTS" filed Mar. 6, 2000.

TECHNICAL FIELD OF THE INVENTION

The invention relates to occupant protection in an automobile interior impact and, more particularly, to a method for designing an energy-absorbing impact zone, as well as the composition of materials thereof.

BACKGROUND

The National Highway Traffic Safety Administration's (NHTSA) Federal Motor Vehicle Safety Standard 201 (FMVSS201), entitled "Occupant Protection in Interior Impact," provides specific requirements for upper interior impact protection of an occupant of a motor vehicle. The NHTSA estimates that even with airbags, the vehicle occupant's impact with the pillars, roof-side rails, windshield header, and rear header result in 1,591 annual passenger car occupant fatalities and 575 annual LTV occupant fatalities. Further, the NHTSA estimates that such head impacts result in nearly 13,600 moderate to critical (but not fatal) passenger car occupant injuries and more than 5,200 serious LTV occupant injuries. According to FMVSS201, manufacturers decide how to meet the requirements of the Aug. 18, 1995 final rule. A popular method of compliance is the installation of energy-absorbing countermeasures (CM) such as padding, which manufacturers hope will reduce the number and severity of these injuries. The NHTSA estimates that the new requirements will prevent 675 to 768 moderate to critical passenger car occupant injuries and 873 to 1,045 fatalities. Further development of dynamic head-protection countermeasures offer the potential for further reducing injuries.

While impact-zone designers typically understand head injury criteria and the various safety standards, a major problem with current design of countermeasures is that testing has not been repeatable or consistent from one laboratory to the next. While careful attention to testing details has removed most of the ambiguity that plagued past design efforts, particular attention must be paid to the vehicle being impacted, including whether the doors are shut and the windows rolled down, and whether the same target spot on the free motion headform is used, and whether the launch angles and actual launch speed are the same.

Finite Element Analysis (FEA) is one proposed solution, but it is effective only approximately half of the time because of complex failure modes and limited high-speed material data. Once a material is selected, material models may be created, but that requires additional research effort itself. While FEA is a valuable tool for enhancing countermeasure design for a given vehicle, it cannot solve a design problem nor give an understanding to the physical limits of possibility. FEA is limited in predicting vehicle FMH responses because:

Materials are often utilized well into the nonlinear region of the stress strain responses.

Contact elements are typically required so those components can push on each other but not necessarily pull.

Many countermeasures accomplish energy absorption through a fracturing mechanism that is difficult to model.

Many of the countermeasure materials exhibit a speed dependent response, which may not be available in material data files for FEA.

The materials (including steel) typically behave as a spring damper combination and not simply as a non-linear spring.

Thus, in order to use FEA to accurately predict the degree of injury, a material model should include speed, damping, temperature, nonlinear and fracture components built into its code to accurately model three-dimensional sheet metal, headliner and plastic components. Of course, if enough effort and research is put into understanding specific materials, then FEA could be used with limited success. Therefore, an impediment to practical application of the FEA is the substantial variety of materials in use today.

Most current attempts to pass the FMVSS201 focus on meeting the safety standards through a trial and error approach. The problem with this approach is that while adequate space may exist in a particular design to accommodate a countermeasure, the countermeasure may be too soft or too hard. Both scenarios result in a high head injury factor, possibly even the same number, and both tests would be considered failures. Failure to understand this and thus pursuing parallel path solutions and alternatives has resulted in substantial expense to the automobile industry.

SUMMARY OF THE INVENTION

The method and materials according to the invention for designing an interior impact zone for motor vehicles include using a force versus deflection curve to understand impact dynamics as well as countermeasure material/structure design. The method allows a designer to efficiently evaluate material and structure in order to design a countermeasure that meets safety standards. The shape, length, and height of the force versus deflection curve are used as the primary design criteria. Further, the method includes interpreting test results to improve the countermeasure design.

DETAILED DESCRIPTION OF THE PREFERRED EMBODIMENTS

The method according to this invention provides a cost-effective solution to meeting safety standards and is applicable to any material, including but not limited to metal, glass, polymers, organics (such as pulp, paper, cardboard, etc.) and synthetics having any structural form including but not limited to porous, foamed, fibrous, composite, corrugated, etc.

The NHTSA safety standard is designed to reduce head injury sustained by a blunt impact in a vehicle crash. It applies to headliners, pillar trim, and overhead systems. Testing to meet the safety standard requires a ten pound simulated human head, called a free motion headform (FMH) to be launched into specific points of the vehicle at 6.7 m/s (15 miles per hour). Three accelerometers are placed at the center of gravity of the FMH to measure the deceleration of the FMH during impact. A head injury criterion (HIC) number is calculated based on the vector sum of the three decelerations measured with respect to time. The maximum HIC number is calculated and converted to an equivalent number that simulates a full dummy test, which is referred to as HIC(d).

The basis for HIC is the Wayne State Tolerance Curve (WSTC), which is the product of research conducted by Wayne State University. The WSTC is a plot of acceleration versus impulse duration for producing skull fracture in a translational mode for human cadavers. While skull fracture was an easy point to identify in test cadavers, detecting serious brain injury is more difficult because it can occur without fracturing the skull. The WSTC was used as the basis for the Gadd Severity Index (GSI), which weighted the impulse duration. The GSI was modified with resultant acceleration to form the Head Impact Criterion, or HIC, as proposed by the NHTSA in 1972.

The HIC(d) is a mathematical expression to describe the curve fit of experimental data that establishes a threshold for skull fracture resulting from blunt impact as described in *Meeting Interior Head Impact Requirements: A Basic Scientific Approach*, SAE 2001-01-0469, Bellora, Krauss, Van Poolen, which is incorporated by reference herein. The HIC(d) number has units of $g^{2.5} \times$ seconds, which reduces to $m^{2.5}/sec^4$. For the purposes of this specification, a derived unit for HIC(d) will be called hu, which allows for generalized calculations without regard to the unit system employed. Thus:

$$1\ hu = 1\ g^{2.5} \times sec \quad (1)$$

$$1\ hu = 301.163\ m^{2.5} \times sec^{-4} \quad (2)$$

$$1\ hu = 5872\ ft^{2.5} \times sec^{-4} \quad (3)$$

HIC(d) units are not energy, impulse, or any other common parameter that engineers use to understand and quantify physical phenomenon. Rather, HIC(d) is merely a curve fit to a particular set of test data illustrating the severity of human injury resulting from blunt impact.

Figure 1:
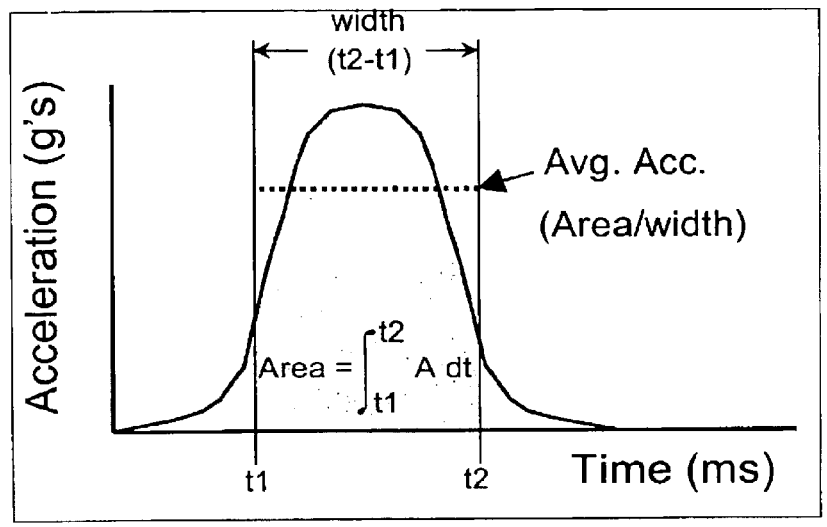
FIG. 1 is a graph illustrating the area under an acceleration versus time curve.
Figure 2:
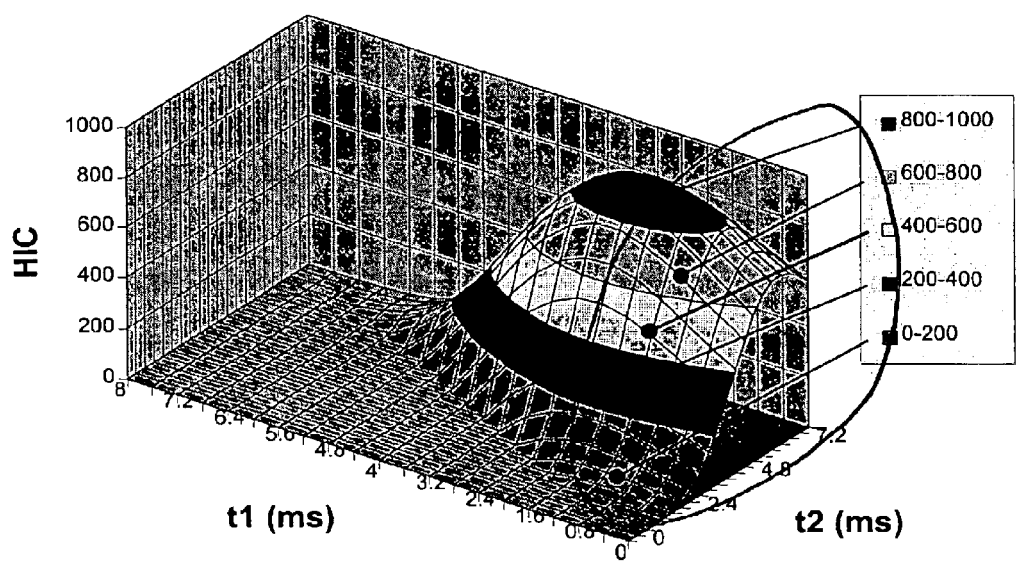
FIG. 2 is a Haversine wave illustrating HIC versus time.

The original HIC is based on average acceleration during the impact pulse. During live vehicle impacts, the acceleration is more sinusoidal, or simply erratic as opposed to constant. To compute the average acceleration, the area under a portion of the acceleration curve is divided by the width of the acceleration curve (t2−t1), which gives the height of an equivalent rectangle or, in other words, average acceleration. For example, and with reference to FIG. 1, in order to get a HIC value for a particular impact, (1) determine the area under the acceleration curve between t1 and t2; (2) determine the width, which is the absolute value of the difference between t1 and t2; (3) determine the average acceleration, or height, by dividing the area by the width; and (4) determine HIC by multiplying the width times the average acceleration, which is taken to the 2.5 power. To $$Hic = (\Delta t) \cdot \left[ \frac{\int_{t1}^{t2} a\,dt}{(\Delta t)} \right]^{2.5} \quad (4)$$

determine the maximum HIC value, various t1 and t2 values are used to find the largest value. In summary:

where $\Delta t$ is equal to t2−t1. The maximization of the HIC value can be expressed as the maximum point on a surface plot of every value of t1 and t2 used to calculate the HIC value, as illustrated in the surface plot for a Haversine wave of FIG. 2.

Because a free motion headform is used to determine a HIC value, a conversion formula to the full dummy equivalent, or HIC(d), is required:

$$HIC(d) = HIC \times 0.75446 + 166.4\ hu. \quad (5)$$

Thus, if the measured FMH HIC=840, then the equivalent HIC(d)=800.

The government requirement for the HIC(d) is not to exceed 1000. Most vehicle Original Equipment Manufacturers (OEM) target a HIC(d) number of about 800 for a safety margin. Therefore, a HIC(d) target number of 800 will be used herein by way of example along with the force, energy and deflection values corresponding thereto, but the methodology is applicable to other selected HIC(d) target numbers and corresponding parameters. Industry testing standards include a test speed of approximately 6.7 m/s, which will be used throughout by way of example along with the energy values corresponding thereto, but the method of this invention applies to any test speed and corresponding energy values.

According to a preferred embodiment, the method of this invention employs a force versus deflection curve to understand impact performance as well as efficiently designing the countermeasure material and structure. In order to assess impact performance of a particular structure or material, the total deflection is considered to be the sum of individual springs, where the springs represent components of the countermeasure material and/or vehicle structure. An effective radius is calculated to take into account headliner geometry, which affects countermeasure material and design. From the force versus deflection curve, series spring concept and effective radius calculation the method for designing countermeasure materials and structure design can be determined. However, peak acceleration must not exceed 140 g so that 800 HIC(d) is not exceeded, depending, however, on the shape of the acceleration versus time plot. Further, in designing countermeasure materials and structure, the center of gravity of the free motion head form (FMH) should travel approximately 32 millimeters, which becomes a budget for deflection between the countermeasure and the vehicle structural material.

In order to obtain a desirable HIC(d) number, evaluate materials, and analyze test data according to the invention, it is necessary to understand acceleration versus time curve (ATC) waveforms, which illustrate the limits of possibility. This provides the framework for designing countermeasure material and structure to meet safety standards. Once an ATC is determined, velocity versus time curve (VTC) and displacement versus time curve (DTC) can be determined. Force versus displacement curve (FDC) and energy versus displacement curve (EDC) can also be determined. Appendix B presents an exemplary method to convert raw data into the graphs discussed herein, however any suitable method may be used in alternative embodiments. Some other works have also analyzed waveforms, such as *Analytical Studies of the Head Injury Criterion (HIC)*, SAE 740082, Chou, Nyquist, incorporated herein by reference.

Figure 3:
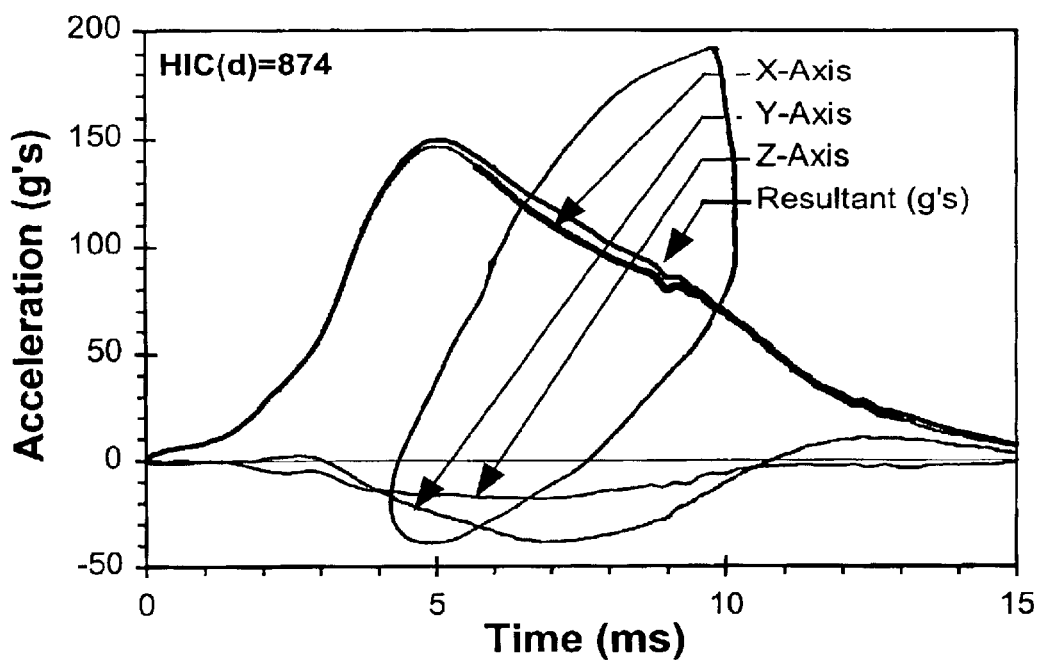
FIG. 3 is an acceleration versus time curve.

As shown in FIG. 3, the Acceleration versus Time Curve (ATC) is obtained by measuring three triaxial accelerometers placed at the center of gravity (CG) of the FMH with respect to time during the test impact. The vector sum is then calculated from the three acceleration magnitudes at each discrete time point. Accordingly:

$$\text{Acceleration} = (x_{acc}^2 + y_{acc}^2 + z_{acc}^2)^{0.5} \quad (6)$$

Figure 4:
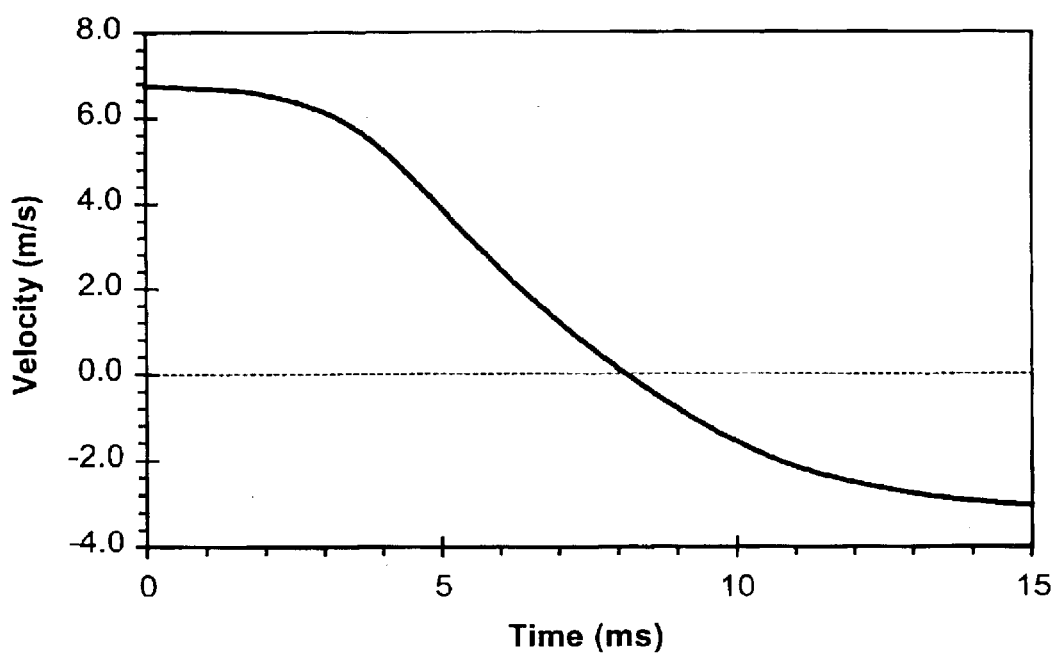
FIG. 4 is a velocity versus time curve.

An example of a Velocity versus Time Curve (VTC) is shown in FIG. 4. The VTC is the ATC integrated with respect to time using the trapeziodal rule and plotted against the original time data and subtracted from the initial velocity just prior to impact ($v_0$).

Figure 5:
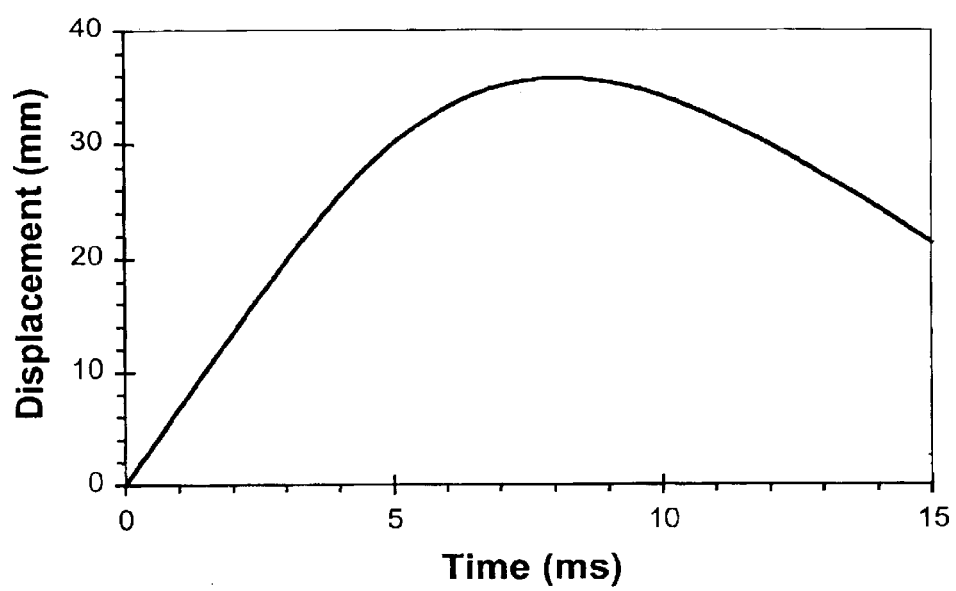
FIG. 5 is a displacement versus time curve.

As shown in FIG. 5, a Displacement versus Time Curve (DTC) is determined by integrating the VTC with respect to time using the trapezoidal rule and plotting against the original time data.

Figure 6:
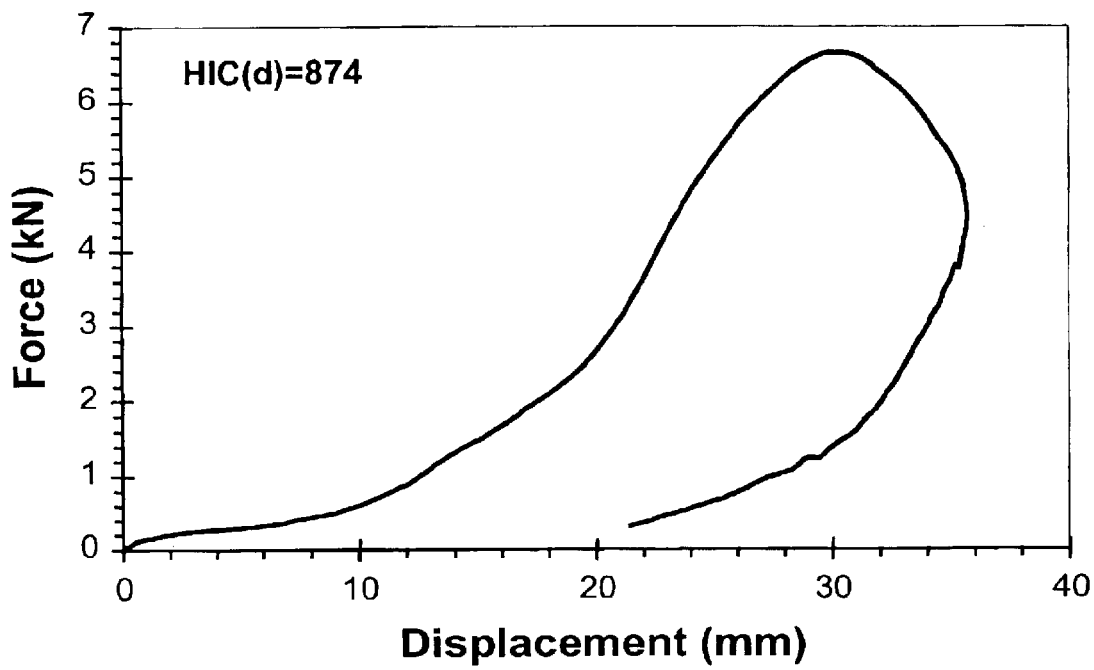
FIG. 6 is a force versus displacement curve.

By plotting the acceleration multiplied by the FMH mass against the displacement, a Force versus Deflection Curve (FDC) can be obtained, as illustrated in FIG. 6. The FDC curve is the primary tool used to understand the individual test impact and can be used to diagnose the strategy for lowering the HIC(d) number. The FDC will be discussed below.

Figure 7:
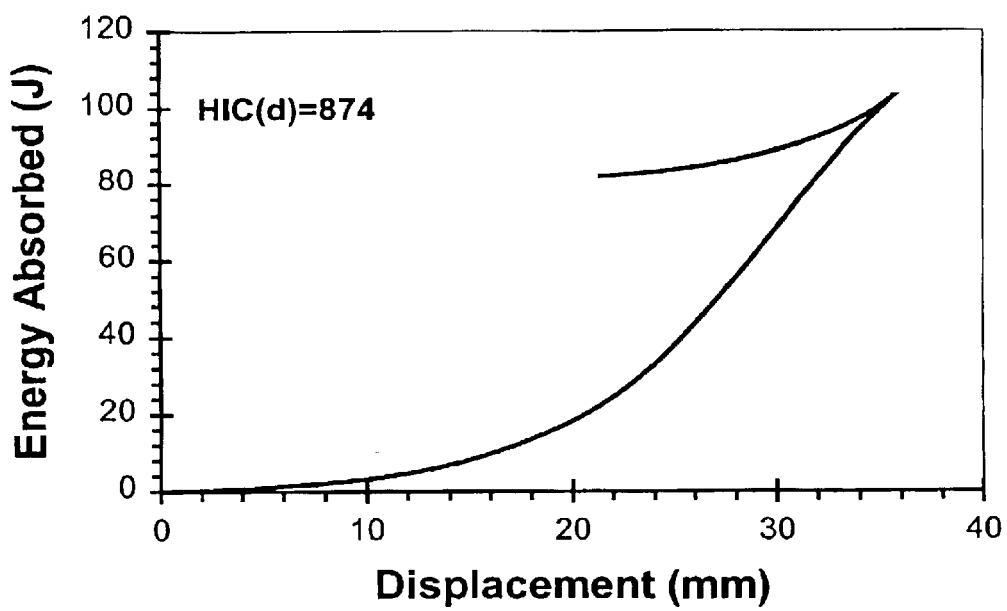
FIG. 7 is an energy versus displacement curve.

With reference to FIG. 7, the Energy versus Displacement Curve (EDC) illustrates the energy absorbed as a function of distance. The EDC is determined by finding the area under the FDC by integrating with respect to displacement by using the trapezoid rule once again. The maximum value should equal the kinetic energy (KE) input, where:

$$KE = (½) * m * v_0^2 \quad (7)$$

The KE of the FMH at 6.7 m/s is about 102 Joules (J).

Figure 8:
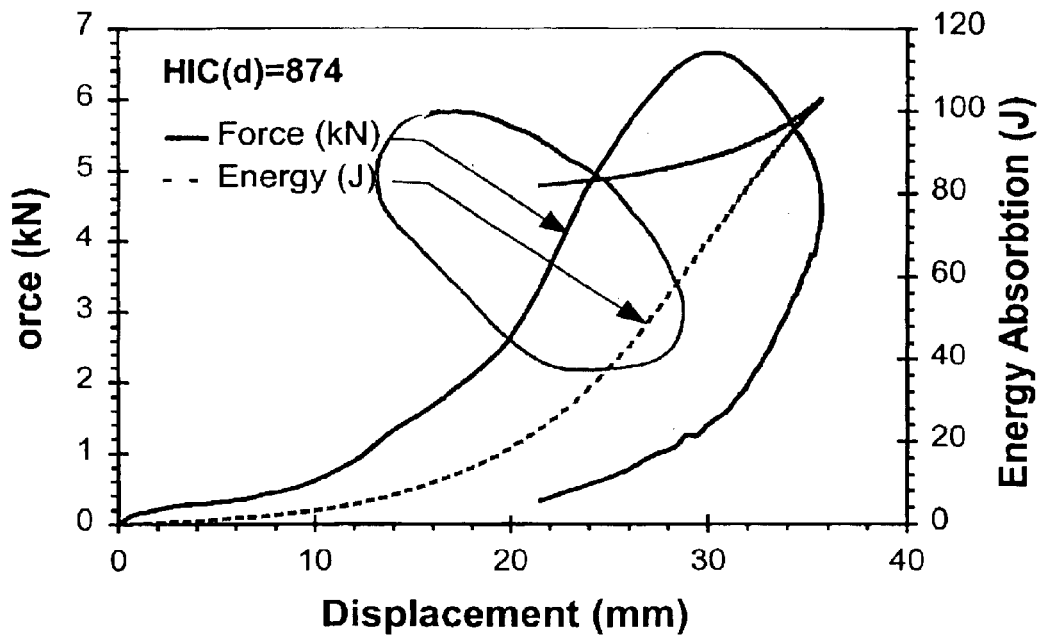
FIG. 8 is the curve of FIG. 7 overlaying FIG. 6.

FIG. 8 shows the FDC and the EDC superimposed, which provides additional useful design assessment information.

In determining the design limits, the limits of physical possibility for HIC(d) values are important because they teach what can be found in actual vehicle testing. To understand these limits, a comparison of several waveforms is illustrative.

Figure 9:
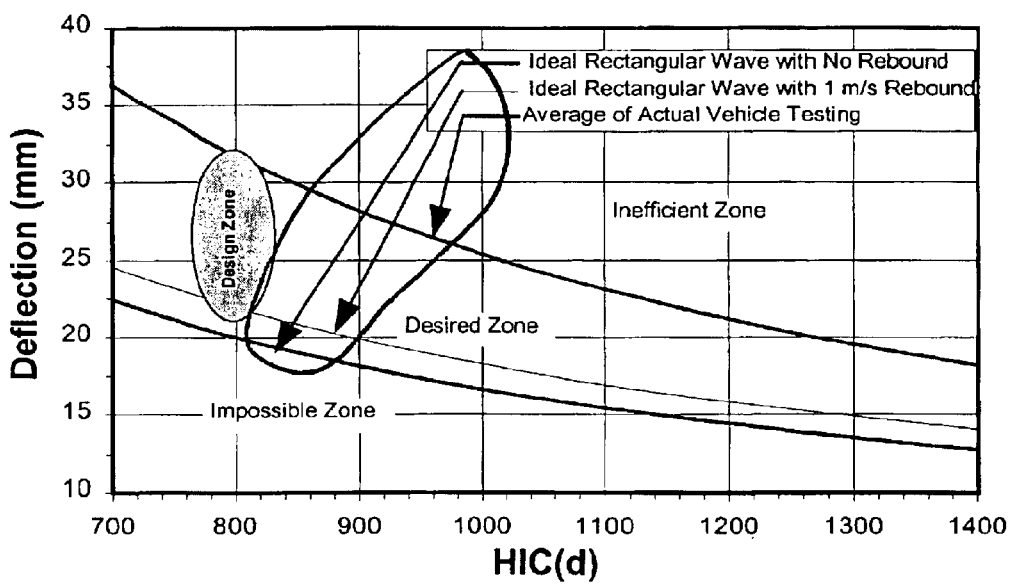
FIG. 9 is a graph of deflection versus HIC.
Figure 10:
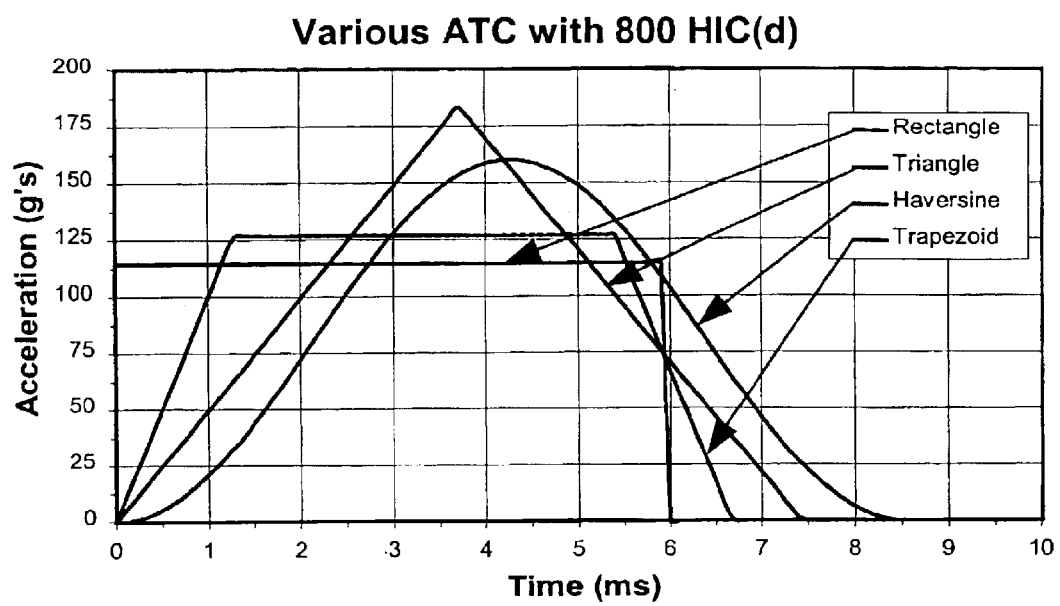
FIG. 10 illustrates various ATC with 800 HIC(d)
Figure 11:
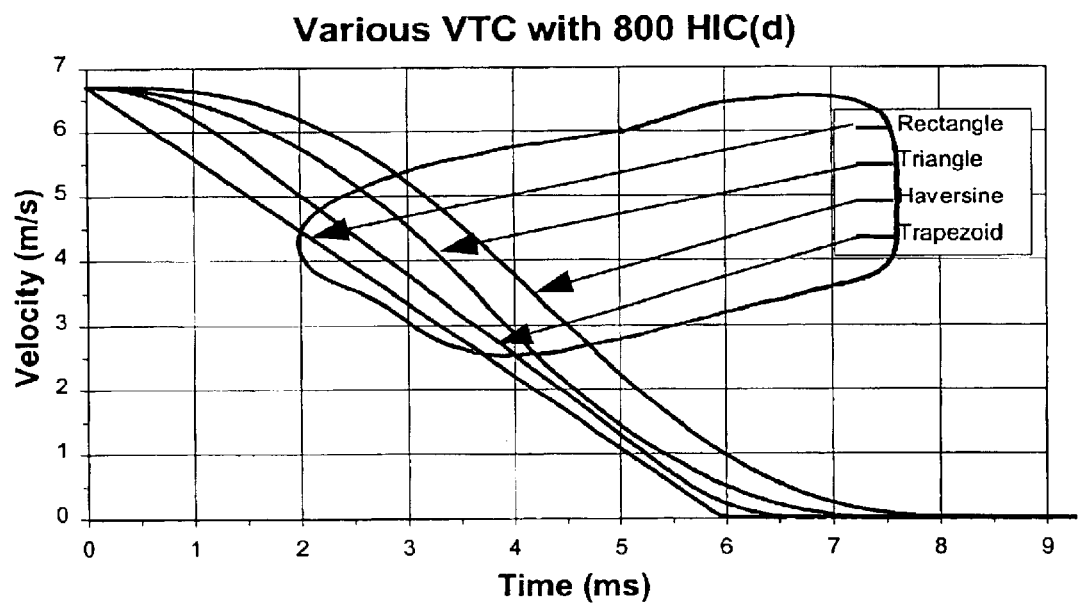
FIG. 11 illustrates various VTC with 800 HIC(d)
Figure 12:
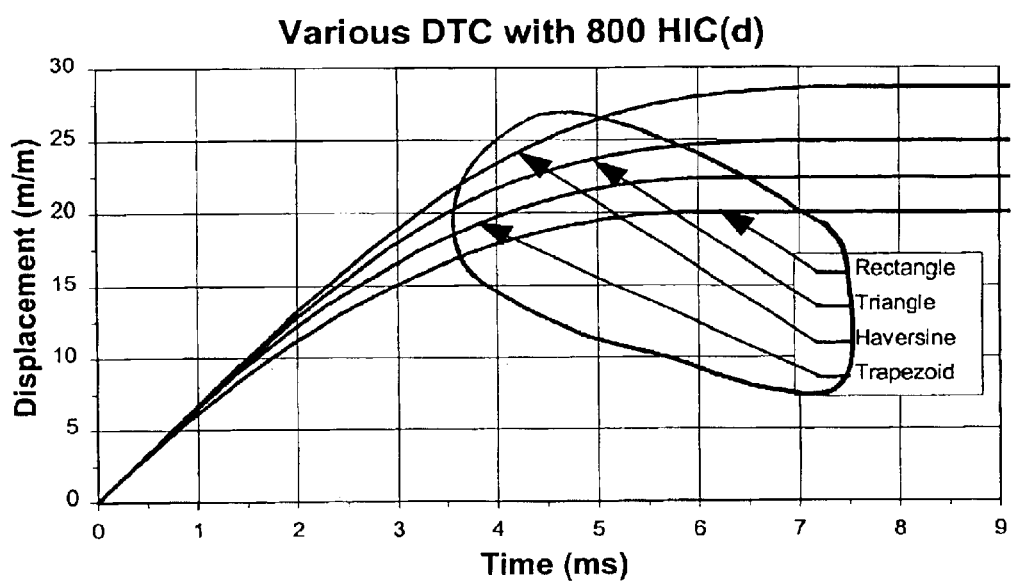
FIG. 12 illustrates various DTC with 800 HIC(d)
Figure 13:
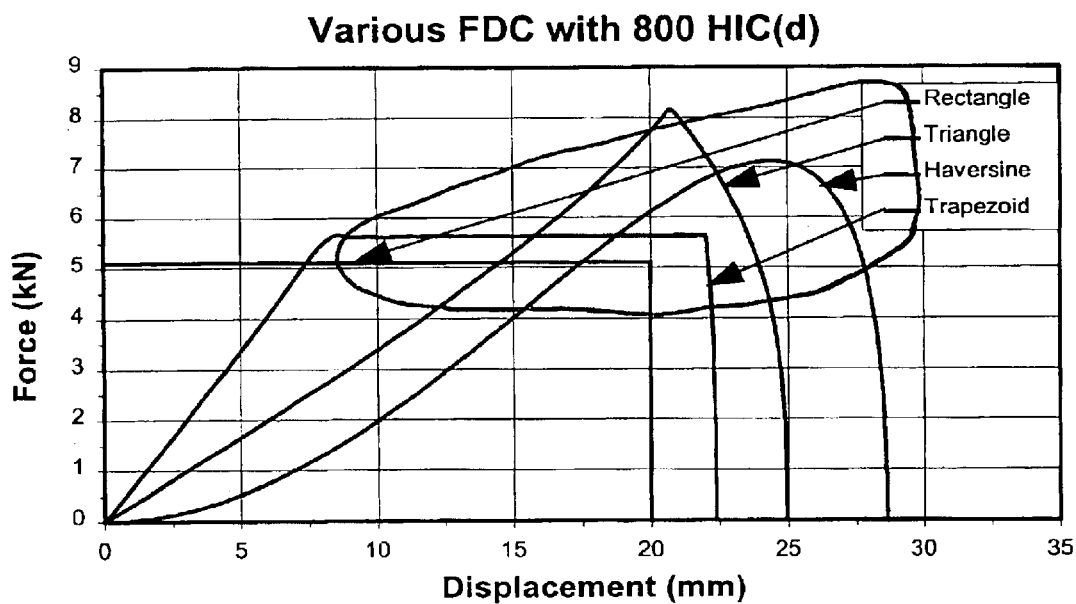
FIG. 13 illustrates various FDC with 800 HIC(d)
Figure 14:
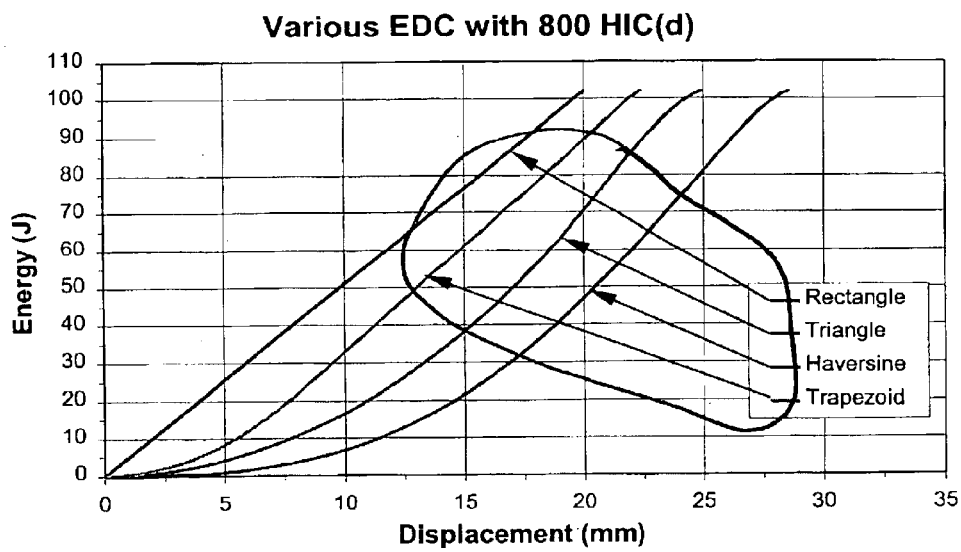
FIG. 14 illustrates various EDC with 800 HIC(d)

The square wave or rectangular wave is the perfect ideal response of an FMH test impact independent of what is contacted. The full derivation of the rectangular wave with rebound can be found in Appendix C. This graph indicates that for a perfect ideal response and a HIC(d) of 800 the CG of the FMH must travel at least 20 mm. It is also informative to note that the FMH with its skin does not have a perfect rectangular wave response itself and therefore prevents a perfect composite response no matter what you use as a countermeasure. While the FMVSS201 calls for HIC(d) of less than 1000, the OEM often require a design target of 800. The desired design zone is shown in FIG. 9. The bottom line is the limit of physical possibility and the top line represents a typical or average response.

The Haversine wave is simply a cosine function shifted to start at zero. The Haversine wave is the closest representation of a typical response waveform.

The symmetric triangle response is observed occasionally and allows for a much higher peak acceleration for a given HIC(d) number because the HIC(d) value is calculated from an average acceleration over a time interval and not the peak. The triangle wave is much more efficient than the Haversine wave for the same peak acceleration and time interval because it removes energy faster than the Haversine wave. This can be observed by comparing the ATC and FDC for each.

There are additional injury mechanisms that are not part of FMVSS201 and it is important to note that just passing HIC(d) alone does not prevent an occupant from being injured. While it is impossible to verify and hence legislate against every injury mechanism, it is important to understand the dangerous zones so that vehicles and countermeasures can be designed to avoid them. One of the dangerous zones is the jerk limit which shows up as a slope limit on the ATC; a suggested injury criteria is a jerk limit of 100 g's/ms. The rectangular wave has been derived with this as a modification to the initial and final slopes, which makes a trapezoid in the ATC. The trapezoid represents a safer design limit.

Figure 15:
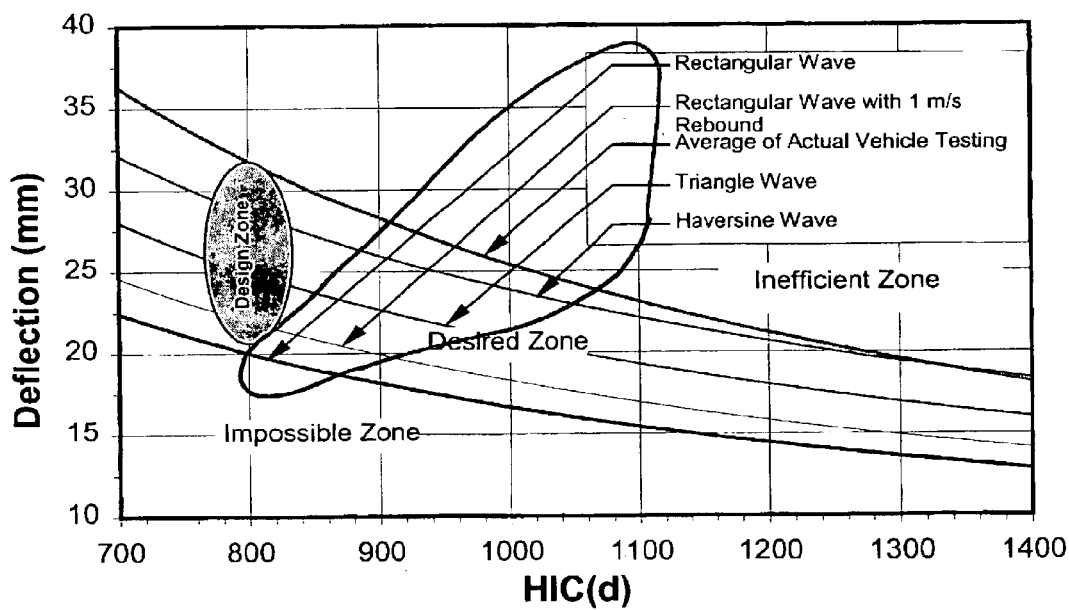
FIG. 15 is a graph of deflection versus HIC(d)

FIGS. 10–15 compare these curves at an FMH speed of 6.7 m/s with a 800 HIC(d). FIGS. 10, 11, 12, 13, 14 depict various ATC, VTC, DTC, FDC, and EDC, respectively, with 800 HIC(d). The FDC is the most noteworthy of these comparisons because the maximum deflection and forces differ with the different waveforms. Further, the curves in the EDC peak at 102 J but the distance required to absorb the energy changes with different waveforms. All of the derivations have been performed with $v_0$ as an input variable for graphs at 6.7 m/s as well as 5.36 m/s (12 miles per hour) for side curtain airbag applications. FIG. 15 shows deflection versus HIC(d), which illustrates the required distances for the different waveforms and the desired design zone at 6.7 m/s.

Figure 16:
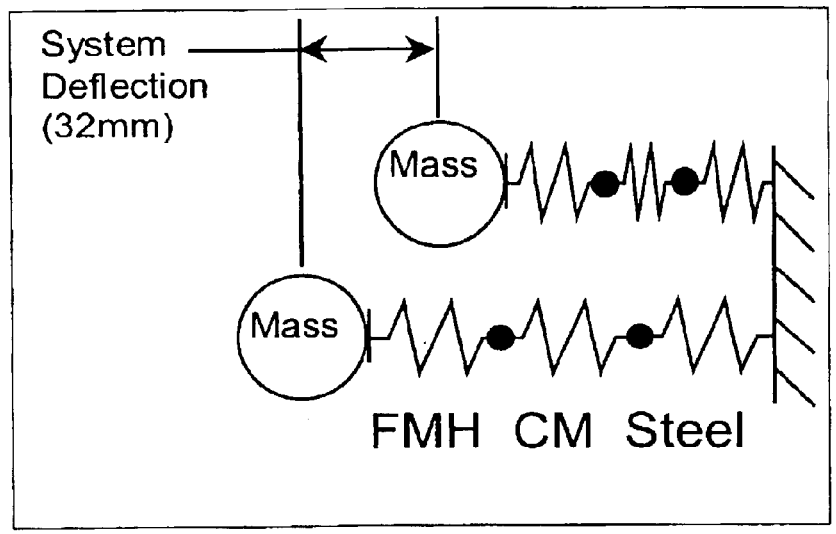
FIG. 16 a diagram of a series spring concept.

The FMH test impact upon the vehicle structure is akin to stopping a mass with a group of springs in series. This Series Spring Concept, as illustrated in FIG. 16, explains that the total deflection of the structure resulting from an impact with the FMH can be considered as a sum of individual spring-like components. The first spring is the FMH, the second is the countermeasure, and the third is the vehicle sheet metal. The total deflection of the FMH's center of gravity must be at least 20 mm and more likely 32 mm in order to have less than 800 HIC(d). The total deflection of 32 mm has been determined from actual vehicle testing with various countermeasures. The more general form is:

$$\text{Deflection (mm)} = \frac{25400}{\text{HIC(d) Desired}} \quad (8)$$

If the sheet metal component is sufficiently soft then no countermeasure is needed. If the sheet metal is very stiff, such as in an A-Pillar area, then the countermeasure will have to deflect the remainder of the distance of 32 mm. It is important to note that the FMH will deflect about 5 mm at the target level of forces.

To determine the necessary data, dynamic head impact testing is performed by using an MGA pneumatic launching system to propel a First Technology Free Motion Headform, or FMH. Each FMH contains three Endevco model 7264-2000TZ accelerometers, which are used to measure acceleration during the impact event and calculate the impact speed by integrating the x-axis acceleration during launch and free flight. Other headforms and acceleration measuring instrumentation sufficient to collect impact test data may be used in alternative embodiments.

A Calex Model 160 Bridgesensor including a hardware lowpass filter with a 3300 Hz cutoff frequency is used to process these accelerometer signals, which are then digitally sampled at 10 kHz by a customized Labview application. This application also includes a second order Butterworth software lowpass filter with a 1650 Hz cutoff frequency. Other signal processing instrumentation having suitable response characteristics may be used in alternative applications.

Figure 17:
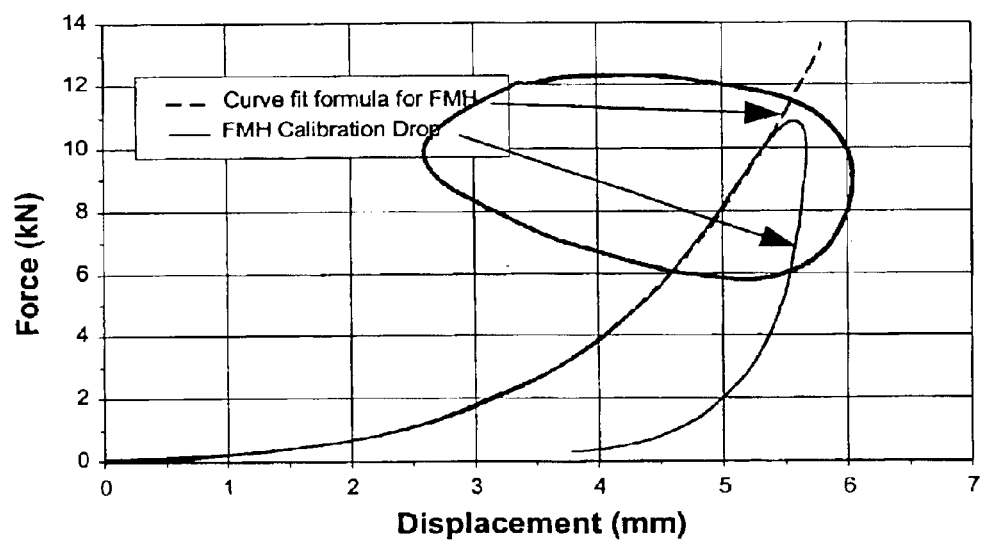
FIG. 17 is a graph of curve fit for FMH calibration response.

Regarding the speed dependent properties of the FMH, increased speed of the FMH increased the FDC to the right but does not change the slope. Further, the FMH behaves as a nonlinear spring damper that has only about 7 J of energy absorbed at the 6.2 kN force level. This means that the FMH only accounts for 7% of the energy in a FMVSS201 test. Therefore any temperature variations and speed dependency of the skin is of almost no concern in actual practice. With this in mind, a FDC was obtained during FMH calibration drops, which can be considered a reasonable response for the FMH spring damper component. Calibration "drops" are ordinarily performed on the FMH by releasing the FMH several feet above a rigid horizontal surface and allowing it to accelerate under gravity until impacting the rigid surface. The drop enables test personnel to ensure the accuracy and consistency of accelerometer performance. This FDC indicates that the FMH accounts for about 7 percent of the energy and about 5 mm of deflection in a test that yields results of about 800 HIC(d). FIG. 17 shows a curve fit derived from experimental data to describe the first part of an FMH calibration drop according to:

$$\text{Force (kN)} = \frac{e^{\left(4.37173+1.17295*\delta(mm)^{-0.04989*}\delta(mm)^2\right)}}{1000} \quad (9)$$

Figure 18:
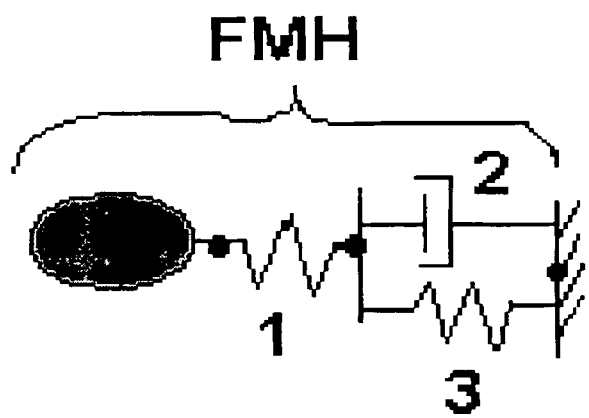
FIG. 18 is a diagram of spring damper model for FMH calibration.

A nonlinear differential equation model of the FMH has been developed using a State Space model with the Runge-Kutta numerical method. The model was matched to an FMH calibration drop and solved using Mathcad software. The diagram for the elements are shown in FIG. 18. The higher the power used, the higher the coefficient that is needed.

The mass on the left is taken as 4.439 kg and the intermediate mass of 0.096 kg was used between the springs at the central node. An initial velocity of 2.716 m/s for the large mass was the initial condition used. Calibration drops are at a reduced velocity to keep force levels similar to what is seen in actual tests. For spring 1, the nonlinear spring relationship between force and displacement is:

$$F(N)=62\times10^{21}\times\delta(m)^8+80\times10^9\times\delta(m)^3+15\times10^4\times\delta(m) \quad (10)$$

For spring 2, the spring relationship between force and displacement is:

$$F(N)=1\times\delta(m) \quad (11)$$

For damper 3, the nonlinear damper relationship between force and velocity is:

$$F(N)=10.97\times10^4\times v(m/s)^{11}+1\times v(m/s) \quad (12)$$

Figure 19:
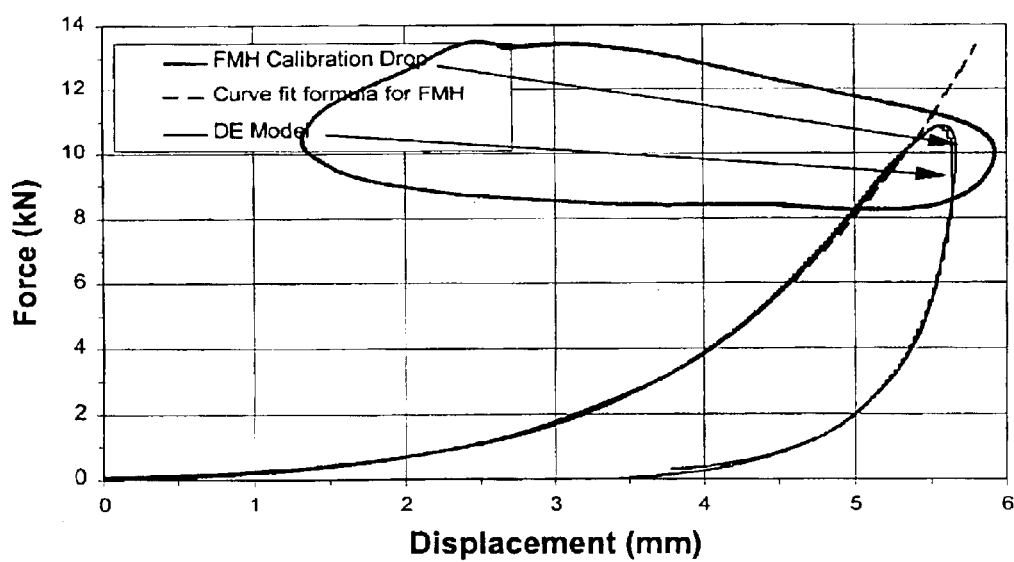
FIG. 19 is a graph illustrating spring damper model for FMH calibration response.

The appropriate units are taken into account already if the values are inserted in the units listed in the equations above. The predicted response of the FMH differential equation model is added to the previous graph and shown in FIG. 19.

A upper limit threshold of about 140 g's on the ATC translates to about 6.2 kN. Generally, this means that the FDC must be below 6.2 kN to maintain a HIC(d) value below 800 in a vehicle test impact. The height of the ATC can be thought of as the primary driver of the HIC(d) number. Some type of waveforms will have a higher threshold of 160 g's or more, especially if the ATC is a triangular shape because HIC(d) is driven by the average g's between t1 and t2 on the ATC, as opposed to the peak g's. A rectangular waveform will have about 115 g's for a HIC(d) of 800. Nevertheless, 140 g's or 6.2 kN is a good starting point for an estimation of a target ceiling for the FDC.

The maximum force threshold is an effective design tool for passing safety standards such as FMVSS201. By shaping the FDC so that the area under the curve (which is a constant of 102 J) is as narrow (lower deflection) as possible without exceeding a height of 6.2 kN, material and structure for meeting FMVSS201 can be designed in a predictable way.

It is important to note that the study of peak g's vs. HIC(d) is not a very effective tool for understanding the process, because peak g's can vary widely depending on the ATC waveform. At a HIC(d) of 800 it is possible to range from 115 g with a rectangular wave to 184 g with a triangular ATC. Relationships developed thus far have not proven productive for any predictions because the ATC waveforms vary considerably based on the type of material structure being impacted with the FMH.

A countermeasure having a proper combination of material and structure is necessary to pass the FMVSS201. For example, if foam cannot be made to a low enough stiffness by lowering the density of the foam, then coring or using strips of foam must be used to change the amount of surface area. The countermeasure must also be designed within a certain package space, which should not be confused with the displacement required to get a desired HIC(d) value. The following formula shows the package space required for a countermeasure based on the previously established 32 mm distance budget.

$$CM_{Package\ Space} = \frac{27\ mm - SteelDeflection}{\eta_{CM}} \quad (13)$$

The countermeasure package space is equal to 27 mm minus the deflection of the steel at the given location in the vehicle (at the 6.2 kN force threshold) divided by the efficiency of the countermeasure. Typically this number is about 0.8, which gives a good first estimate for design purposes.

Figure 20:
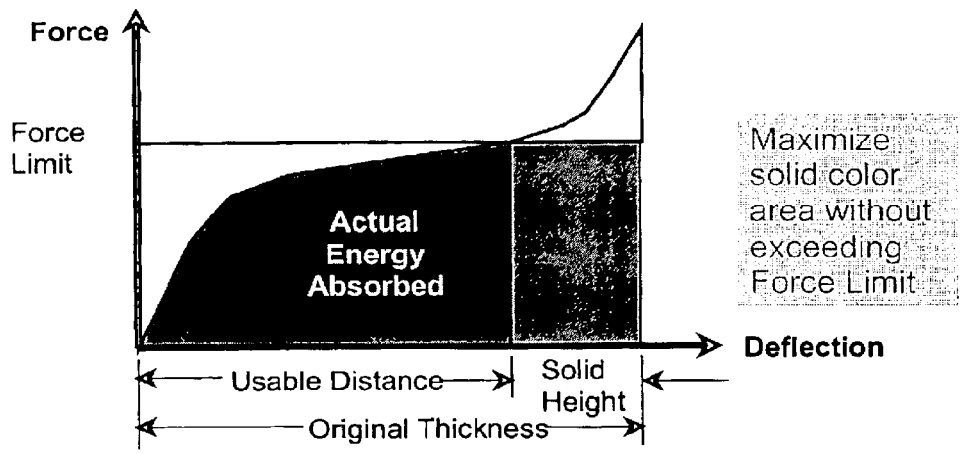
FIG. 20 is a diagram illustrating desired material parameters.

Further, there are three desired material parameters: low rebound (breaking is better that bouncing); (2) convex or trapezoidal wave shape (as opposed to concave); and (3) low solid height (extra package space on top of what absorbs energy). See FIG. 20.

Figure 21:
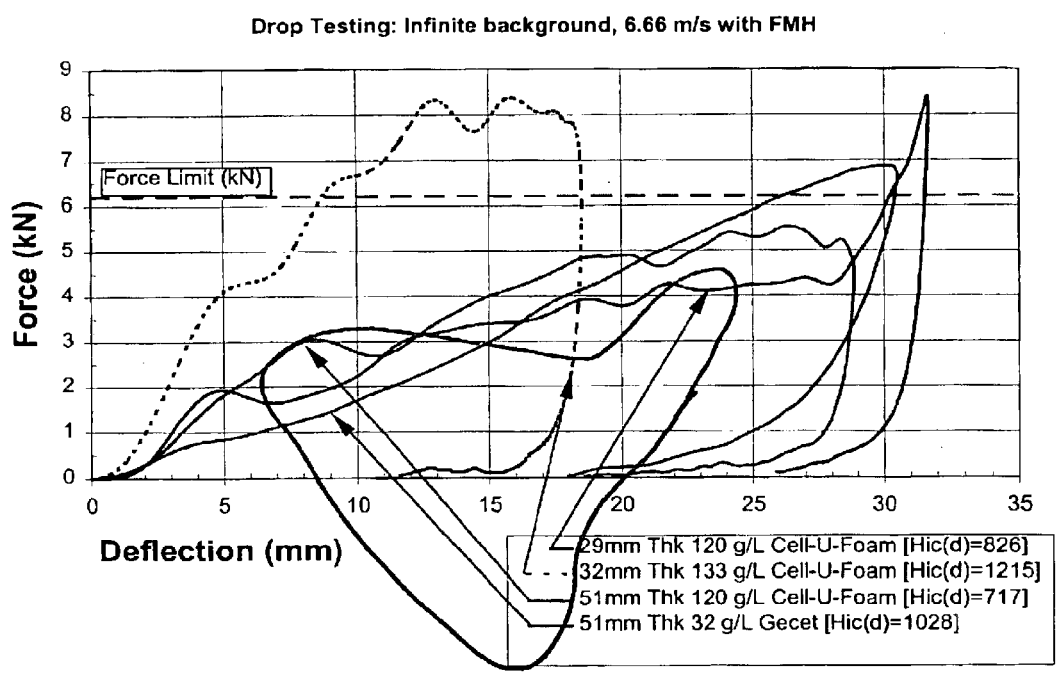
FIGS. 21–23 are graphs of force versus deflection for FMH for different materials.

As an example, a "medium" performance Gecet® expanded foam material, manufactured by Huntsman and a "high" performance glass foam material, manufactured by Cell-U-Foam Corporation, are compared in FIG. 21. The 133 g/L Cell-U-Foam is too stiff for this application and quickly exceeds the force limit. The 29 mm thick 120 g/L Cell-U-Foam has a convex shape and a very good HIC(d) of 826. The deflection of the 29 mm Cell-U-Foam sample is slightly higher than the Gecet®, but the original sample size is 29 mm compared to 51 mm of the Gecet®. This is due to the solid height efficiency of the Cell-U-Foam being 100 percent where the Gecet® is only about 80 percent. In other words the Cell-U-Foam powders completely. The Cell-U-Foam material compressed its entire 29 mm thickness, and then bottomed out, causing a subsequent spike from the FMH compression. A slightly thicker sample would remove the FMH compression spike. The 51 mm Cell-U-Foam shows some improvement and does not exceed the force limit with a deflection of only 28 mm. A slightly higher density of 125 g/L may be optimal in a thickness of 30 mm. The areas under all of the FDC are the same. The strategy is to push the area to the left without exceeding the force limit.

Figure 22:
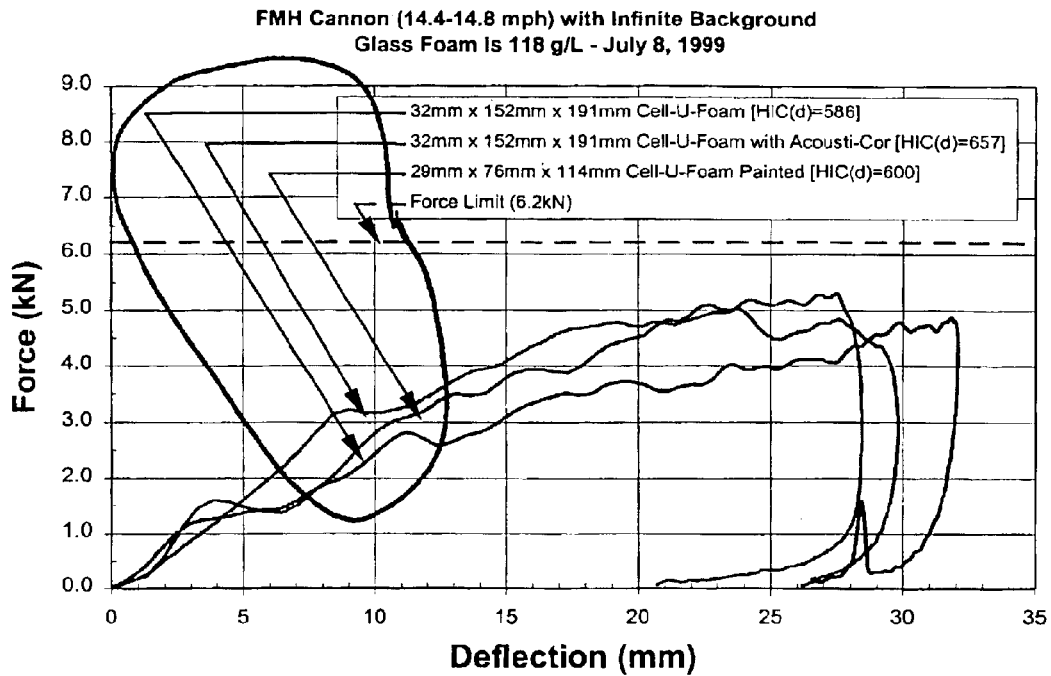

A second set of tests run on the Cell-U-Foam is shown in FIG. 22. The painted part (which improves handling) has a very small surface area and thickness, yet achieved a HIC(d) of only 600 and a total deflection of only 28 mm with an infinitely stiff background. The presence of a stiff Acousti-Cor® headliner raises the HIC(d) number by 71 to 657 and reduces the deflection by 3.6 mm.

Figure 23:
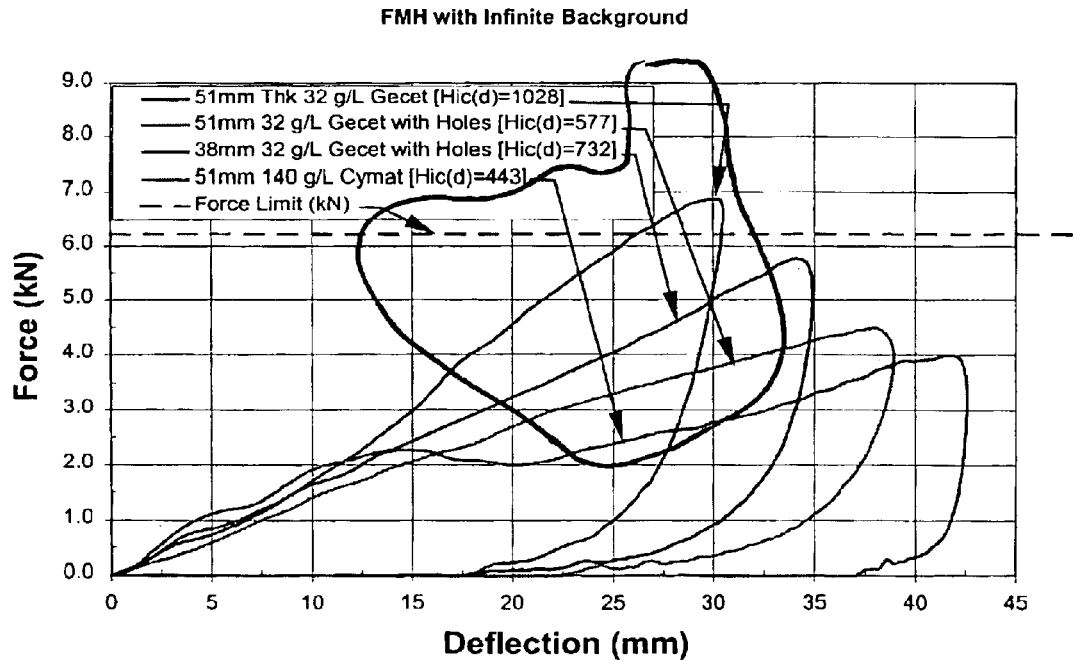

Another material that shows promise as a high efficiency material is an aluminum foam material made by Cymat Corp. A test comparison to Gecet® is shown in FIG. 23. The Cymat material has a good overall trapezoidal shape and a very low HIC(d) number and low peak force. A slightly higher density should be tested to increase the force level (which will drive a higher HIC(d) number) in order to lower the required deflection for better space optimization. Comparisons to drilled-out Gecet® material are also shown because the density of the foam cannot be decreased; instead we decreased the system stiffness by changing the geometry of the Gecet®. Thickness of the Gecet® also affects the system stiffness. The 38 mm thick, 32 g/L, drilled-out Gecet® is the optimal stiffness on this comparison graph.

To predict HIC(d) performance from component level testing up to vehicle level testing, the three dimensional environment must be fully understood. The first step is to understand a one-dimensional approach with a FMH and flat samples of countermeasure and then apply that to complex surfaces found in the vehicle.

Figure 24:
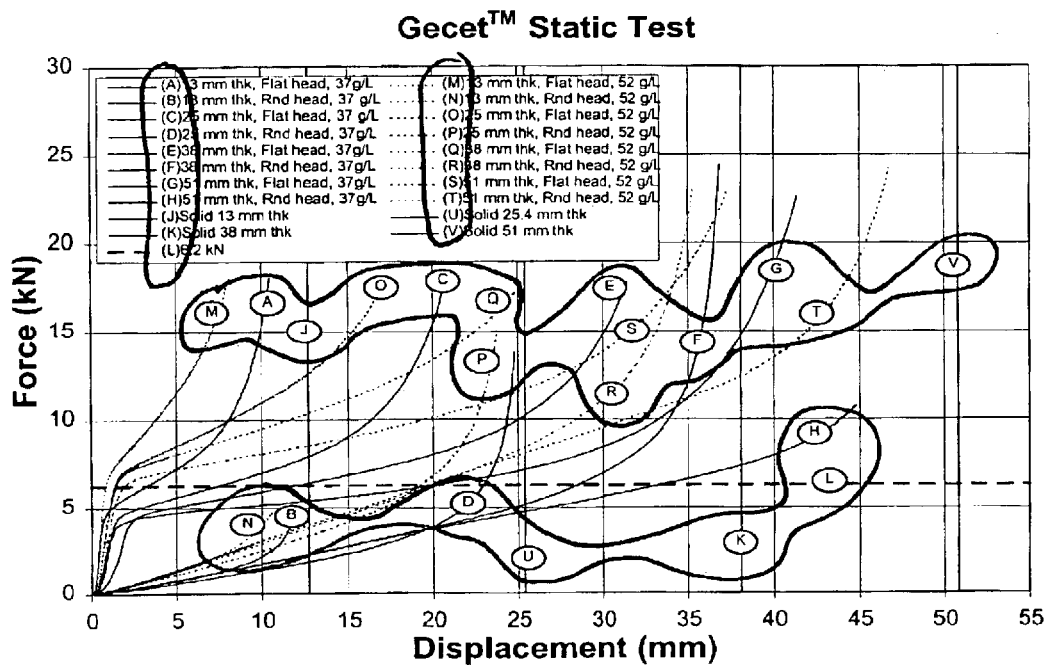
FIG. 24 is a graph of force versus displacement for a Gecet® static test.
Figure 25:
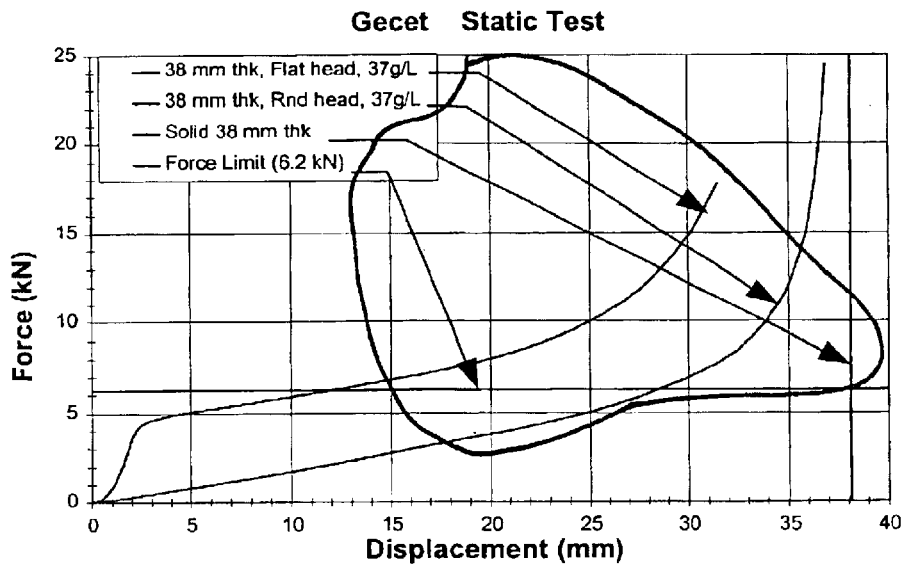
FIG. 25 is a simplified graph of force versus displacement for a Gecet® static test.

Because the FMH is a rounded—as opposed to flat—surface, it will not respond in a similar manner to a flat platen. The two extremes determined from a flat platen and a round platen (with 89 mm radius) bound the response expected with a FMH test. Gecet® foam material was chosen for some of these tests because the static and dynamic force/deflection responses are essentially the same. Both samples are 38 mm thick and 152 mm diameter disks. One sample is tested with an 89 mm radius head. A full plot of the round and flat platen static Gecet® test can be found in FIG. 24. With reference to FIG. 25, what initially appears to be a desirable rectangular response (considered high efficiency) is converted to a nearly linear response (considered medium efficiency). This is due to the fact that only a small surface area is compressed initially, followed by compression of increasing rings of surface area as the spherical head is pressed into the material.

The change is best characterized with reference to an Effective Radius (ERad). The test with the headliner has a larger ERad than the test without the headliner. The ERad of a flat platen is infinite while the minimum ERad has been chosen to be 89 mm with a flat sample of countermeasure as shown in FIG. 25.

In order to understand this phenomenon, a first order approximation of a conversion equation that can take a flat plate Stress verses Deflection Curve (SDC) is derived, shown as $\sigma(x)$, and then converted to a FDC, shown as $F(x)$. The final form is presented below in the Flat to Round Transformation where R is the radius of the head used to compress the material.

$$F(x)=\sigma(x)\cdot(2\cdot R\cdot x-x^2)\cdot\pi \tag{14}$$

Figure 26:
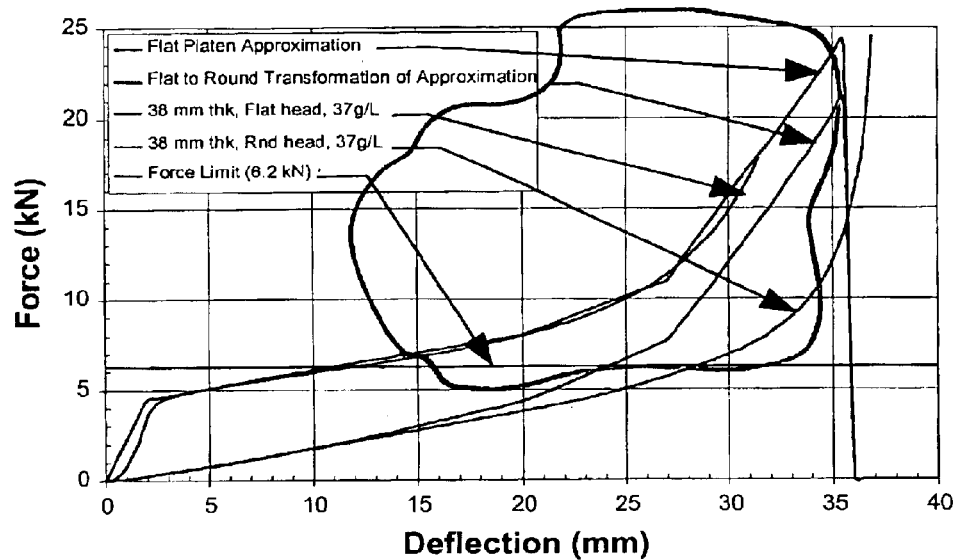
FIG. 26 is a graph of force versus deflection for flat to round comparison.

A comparison of the actual data to predicted response is shown in FIG. 26 on a static test. The formula matches the first (left) part of the curve, which extends until about 20 mm of deflection. A derivation to match the second (right) part of the curve is not critical to the understanding of the basic phenomenon illustrated here, but is provided as Appendix D.

For material specification purposes it is important to recognize that the initial slope or modulus of the flat platen data has very little to do with the round platen response. One effective way to understand the performance of a candidate material is to conduct an impact test with an FMH on an infinitely stiff background at 6.7 m/s. This represents a worst case situation where the countermeasure must absorb 102 J of energy and still maintain a low acceleration value so as to obtain a target HIC(d) value of 800. A FMH on a flat sample of countermeasure is a good representation of a direct side rail test impact in a vehicle.

Figure 27:
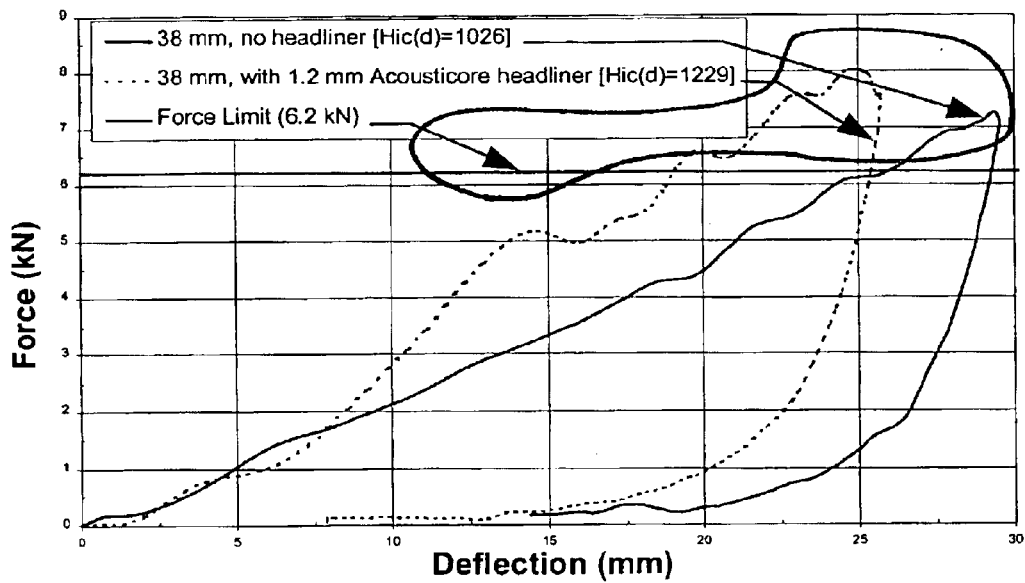
FIG. 27 is a graph of force versus deflection for a FMH dynamic test with 37 g/L Gecet®.
Figure 28:
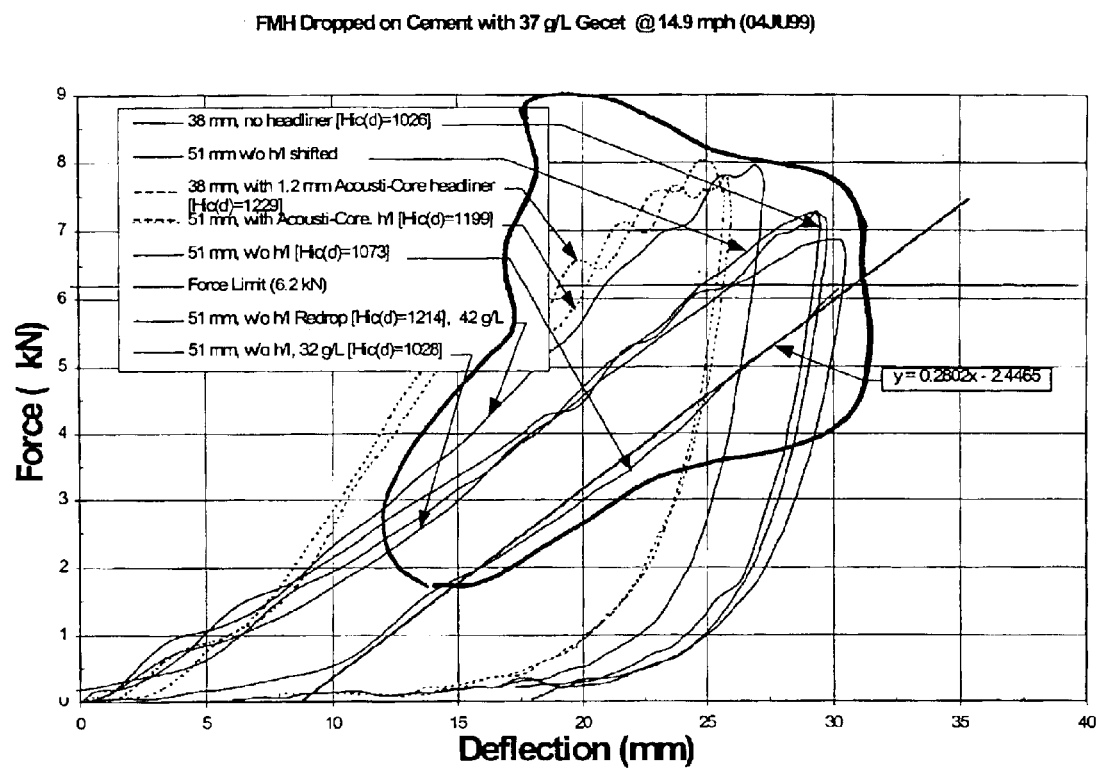
FIG. 28 is a graph of force versus deflection.

FIG. 27 shows an FMH test with 38 mm of Gecet® material. Because foam tests yield generally straight lines when flat samples are used with a FMH, they are a good example to consider. A more complete test data set is provided in FIG. 28. The slope of the resultant lines from foam with no headliner material is slightly steeper than the spherical round platen static test in FIG. 25 because the FMH is flatter in one dimension than the spherical platen. The test with the stiff headliner material forces more surface area to be compressed for a given deflection than without the headliner material as indicated the steeper slope and the knee in the curve. As the headliner becomes infinitely stiff, the response converts to the flat platen response. Thus, the FMH on the material with no headliner is the lower stiffness boundary and the flat platen response is the upper stiffness bound. Both curves have the same area of 102 J. Further, the threshold of 6.2 kN is crossed and the HIC(d) number is greater that 800. While the curve with the headliner is a more efficient curve, the density, and thus the slope, must be decreased to compensate for the increased surface area driven by the addition of the headliner.

A desired rectangular or trapezoidal FDC was placed into the Flat to Round Transformation backwards and solved for the stress versus displacement function so that the flat platen response of a perfect material could be determined. The solution is counter-intuitive and is an initial spike of force with 1/x-type decay.

Figure 29:
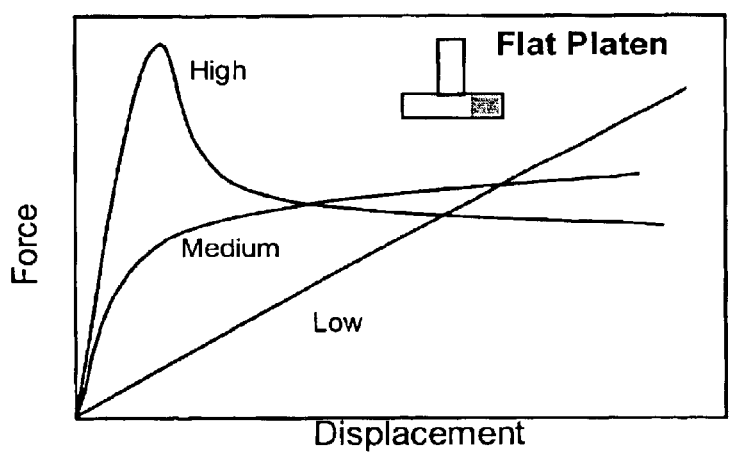
FIG. 29 is a graph of force versus displacement for a flat platen.
Figure 30:
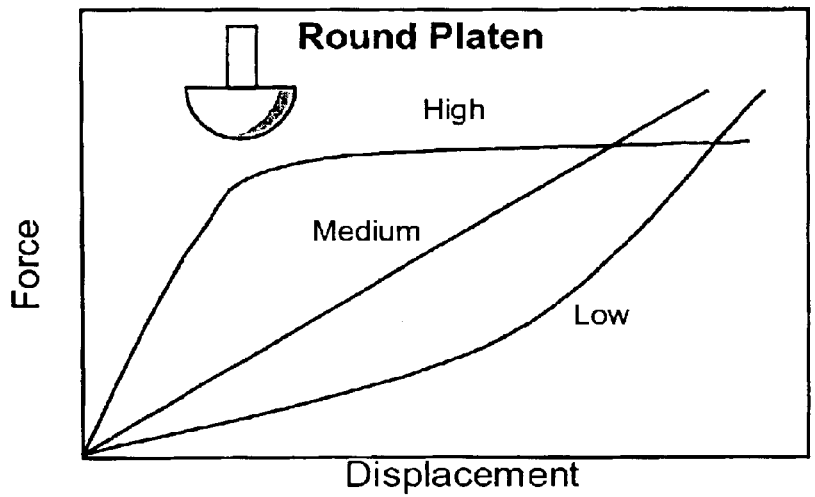
FIG. 30 is a graph of force versus displacement for a round platen.

The graphs of a high, medium and low performance wave forms with a round and flat platens are shown in FIGS. 29 and 30. The high performance curve has an initial spike (undesirable) when tested with a flat platen, but demonstrates a more desirable shape when tested with a round platen. The initial spike explains that a shattering structure or column collapse acts like a high performance countermeasure because it transforms most closely to the desired trapezoid on the FDC. Homogeneous foam waveforms, which look desirable in a flat platen test, translate into a medium performance straight line in a round platen test. Linear springs that appear as a straight line on a flat platen test are a low performance concave shape with a round FMH test. The trend of the Flat to Round Transformation is to increase the order of the exponent of displacement by one on each curve; i.e., the 1/x curve turns to a constant, the constant turns to a linear, and the linear turns to a concave parabola.

The Flat to Round Transformation Function and ERad explain why countermeasures that utilize column collapse or fracture (i.e. rib cartridges, aluminum hexagonal structures and rigid sinusoidal types of countermeasures, etc.) are considered higher performance.

A side-rail test impact in a vehicle may respond in a similar manner to a round platen test in a vehicle. In concave curved sections of the interior headliner the FMH can be "pocketed". If the FMH test impacts an area that is pocketed to nearly the same radius as the FMH (a worst case) then the response will behave more like the flat platen response. Hence for any point in the vehicle from flat to concave this approach can be applied. Another way to describe this is to say that the three-dimensional geometry of the headliner can be described as having a different ERad that is bounded by the previous test of a flat platen and a 89 mm radius round platen. For flat areas of the headliner, pre-crushing an aluminum hexagonal CM is not desirable because it could deflect the initial spike even though precrushing it may be desirable from a manufacturing perspective.

Figure 31:
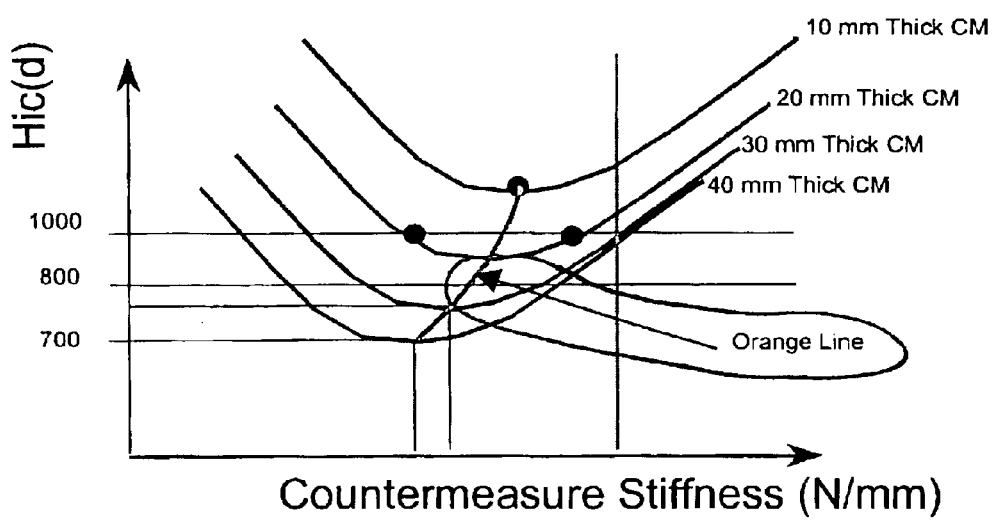
FIG. 31 is a graph of HIC(d) versus countermeasure stiffness.

Once the FDC is used to analyze the system response in a vehicle test impact, the mapping graph of FIG. 31 may be used to determine the next course of action as well as determine whether or not the situation is optimized. Once the situation is optimized, the only alternatives for lowering the HIC(d) number are to increase the countermeasure space or lower the stiffness of the background sheet metal. FIG. 31 provides a useful, semi-quantitative tool. Quantitative mapping graphs can be made for specific areas of the vehicle, but it is preferred to understand qualitative mapping just to point out the direction for lowering HIC(d) and to use the quantitative specific FDC for each test impact.

With reference to FIG. 31, a local minimum can be reached for a given thickness, but once optimized, HIC(d) cannot be improved without increasing the countermeasure thickness (refer to the top, middle dot). If the countermeasure is on the right side of the minimums, (refer to the far right, vertical line), increasing the thickness will eventually show no improvement unless the stiffness is also decreased. The stiffness that achieves the minimum HIC(d) value decreases as the thickness of the countermeasure increases (See middle, curved line extending to top, middle dot). Further, the same HIC(d) value can be achieved with different values of stiffness if the data happens to be located around local minimum. (See dots left and right of the top, middle dot).

If the FMH test impacts a pocketed area of the headliner, or if two points of contact are made, such as the forehead striking the headliner while the chin impacts an A-pillar, the total stiffness is what controls the FDC. If more surface area is contacted by the FMH, then the system stiffness must be lowered in those areas. A free body diagram approach can be taken for the FMH to see main contact areas, which helps illustrate a shared impact or a pocket impact. Also, a section view of the various areas in the vehicle to be impacted is useful for determining the required stiffness.

In instances where a lower stiffness in the countermeasure material is desired, but the material cannot be made less stiff, as in the case of a foam material, then the system stiffness is reduced by reducing the area of impact. For example, substituting small strips of foam instead of a continuous pad to provide less surface area of foam, which results in less system stiffness. For a FDC that is fairly linear, 193 N/mm slope will give about 800 HIC(d). FIG. 23 provides data for a sample having a 38 mm thickness with drilled holes.

During the FMH test, the headform cannot experience more than 140 g's or 6.2 kN in order to not exceed a HIC(d) of 800. The center of gravity of the FMH must travel an average of 32 mm with an optimal case approaching 25 mm from the initial contact in order to not exceed a HIC(d) of 800. The 32 mm travel becomes a budget for deflection between the countermeasure and the vehicle steel. The slight deflection of the FMH provides a minor level of energy absorption, which can be neglected.

The slope suggested by jerk criterion on the ATC at any point on the curve is sometimes exceeded in actual testing with more brittle materials. Slopes of greater than 100 g/ms on the ATC should be avoided.

While industry safety standards do not yet require testing at temperature extremes, the materials in a headliner or an overhead system experience various temperatures during vehicle use and collisions. Materials should be tested as a minimum on a component level at −20 to 70° C. A HIC(d) level of above 1000 should be avoided at any actual use temperature because is an established threshold for serious injury. Preferably, less than 1000 HIC(d) should be achieved at −20, 23, and 70° C.

One unacceptable technique for reducing the HIC(d) number is to cause the FMH to rotate by creating surface ridges in the headliner that will contact the FMH above it's center of gravity. First, the rotational energy is not adequately measured by the three-accelerometer array, thus excessive rotation creates the following drawbacks. The HIC(d) was developed as an injury criteria for a blunt linear impact to the head. It has been shown that rotation modes cause more severe damage to the brain than linear modes. A separate criteria of 16000 rad/s$^2$ has been suggested. Additional testing would have to be conducted to fully investigate an exacting rotational energy criterion and then relate a free motion object with a test-dummy that has a head configured to include interaction with the neck. While some rotation is inevitable during FMH test impacts, using rotation as a design or test technique to reduce HIC(d) numbers is not an appropriate practice.

The automobile interior must be designed so that a direct impact at any overhead area gives a HIC(d) number less that 1000. Angled or rotating test impacts will usually reduce the HIC(d) number. During actual vehicle crashes the human head impacts at whatever angle and whatever point on the vehicle interior that the crash dynamics dictate. According to the preferred embodiment, designing for a worst case test impact (i.e. non-rotating direct test impact perpendicular to headliner) at any contactable point in the vehicle is the preferred practice.

By following the method according to the invention and selecting the materials according to the invention, safety standards can be met, and safer vehicles can be built, regardless of any targeting technique used, thereby providing improved occupant protection.

In summary, using Force versus Deflection graphs according to the preferred embodiment of this invention provides an effective tool for understanding test impacts and developing countermeasure strategies. Further, the Series Spring Concept is useful for adding deflections and energies. The Effective Radius is a useful tool for understanding how the headliner or overhead geometry affects material/structure stiffness. Using the exemplary design parameters disclosed herein, a properly designed system provides 32 mm of total deflection corresponding to 800 HIC(d). Further, the design should not exceed a peak acceleration of about 140 g's to remain within the 800 HIC(d) limit (depending on the shape of the acceleration versus time plot).

Overall, the strategy represented by the preferred embodiment of this invention provides an effective method to safely design vehicles and meet safety standards is shaping the FDC so that the area under the curve (which is a constant of 102 J) is as narrow (lower deflection) as possible without exceeding a height of 6.2 kN. In shaping the area under the FDC curve, the proper thickness of material should be used first, and then the stiffness of the system should be adjusted using the FDC as a tool.

The methods and materials according to the preferred embodiment of this invention lend themselves to additional methodologies for determining the amount of packaging space, within which a countermeasure may be provided, is required to meet applicable safety standards such as FMVSS201. These methods are called Deflection Budgeting, Energy Budgeting, and Adding Force/Deflection Curves.

For each of these three budgeting methods, it will be necessary to assume a force limit. To maintain consistency with the exemplary parameters used throughout, 6.2 kN (1400 Lbf) will be used, however any set of design parameters may be used in alternative embodiments. For all three methods, it will be necessary to do a background test impact for each point in the vehicle. This will consist of test impacting either vehicle steel by itself or with a headliner positioned in front of it.

In the Deflection Budgeting method, we would look at the FDC for the vehicle background (sheet steel structure) hit and then determine at what deflection the curve exceeded the force limit. The deflection at which the FDC exceeds the force limit will be called the usable deflection of the vehicle steel. Based on observations of in-vehicle tests, it is assumed during a hit that has a HIC(d) less than 800, that the center of gravity of the headform will need to travel approximately 32 mm (1.25"). The CM will need to have a usable deflection of approximately the difference between the 32 mm (1.25") total and the usable deflection from the baseline (sheet-steel only) vehicle test. A methodology for determining whether or not a given CM is appropriate for a specific vehicle application would consist of three tests.

The first test would be impacting the FMH alone against a laboratory test stand. Using the series spring analogy, the deflection measured during this test can be broken into two parts as follows:

$$d_{test\_s\ tan\ d} = \delta_{FMH} + \delta_{test\_s\ tan\ d} \qquad (15)$$

where "d" is the measured deflection (obtained from the FDC) and the "δ's" are the supposed individual deflections of the components (springs) involved in the test.

A second test would consist of impacting the FMH alone against the sheet steel structure. Again, the deflection obtained from the FDC can be broken into two parts as follows:

$$d_{vehicle\_steel} = \delta_{FMH} + \delta_{vehicle\_steel} \qquad (16)$$

In the third test, the FMH is impacted against a countermeasure on a component level test stand (a nearly rigid structure). The deflection obtained from this FDC can be broken into three parts as follows:

$$d_{CM} = \delta_{CM} + \delta_{FMH} + \delta_{test\_s\ tan\ d} \qquad (17)$$

The total deflection of this countermeasure placed in front of this vehicle location can then be estimated as $$d_{total} = d_{CM} + d_{vehicle\_steel} - d_{test\_s\ tan\ d} \qquad (18)$$

To understand this equation better, the equations 15, 16 and 17 are substituted into equation 18 with the result:

$$d_{total} = \delta_{CM} + \delta_{vehicle\_steel} + \delta_{FMH} \qquad (19)$$

This analysis shows that, given this test procedure, the deflection budget must include (account for) the "give" in the test stand structure while the "give" in the actual vehicle steel is a deflection that reduces the deflection budget for the CM. The effect of the FMH deflection that is included in the equations 15 and 17 cancels in equation 18 giving equation 19.

The Energy Budgeting method would work much like the Deflection Budgeting method except that instead of adding the deflections observed where the FDC exceeds the force limit, the energy absorbed by the vehicle steel is added to the energy absorbed by the countermeasure up to the force limit. Again the energy absorbed during an impact of the FMH alone against a laboratory test stand must be subtracted out. Accordingly, the energy to be absorbed by the countermeasure when tested on the component level stand is expressed as follows:

$$E_{cm} = 102J - E_{vehicle\ steel} + E_{comp.level\ s\ tan\ d} \qquad (20)$$

Much like in the Deflection Budgeting method, E represents the usable energy of the countermeasure on the component level stand or of the in-vehicle baseline test impact or of the baseline test impact on the component level stand.

For both the Energy Budgeting and Deflection Budgeting methods, it may be beneficial to include some correction factor to account for the deflection or the energy at the end of the FDC where the force level drops back below the force limit. This same limitation applies to the third method. In order to add FDC's we have to guess the backside of the curve where the force is decreasing. It also should be noted that both of the budgeting methods are hindered by the fact that the force limit can vary considerably based on the shape of the ATC or FDC. The third proposed method avoids this limitation because rather than trying to stay below a force limit to get a HIC(d)<800, it predicts the FDC and ATC, and then calculates the HIC(d) based on the predicted ATC.

In the Adding Force/Deflection Curves method, an in-vehicle test of the FMH impacting the bare sheet metal structure is performed and the proposed countermeasures are tested on the component level stand just as before. Based on the modeling assumption that the countermeasure and the vehicle steel act like springs in series, we predict the final, in-vehicle FDC by adding the deflections for the component level energy manager test impact and the baseline vehicle test impact for the same force levels. This will involve interpolating the digital data for one of these test impacts in order to estimate the deflection at the same digital force values as the other test impact. Just as before, we will have to subtract off the deflection of a baseline test impact on the component level stand.

This allows use of experimental data to predict the front side of the FDC of the final system test. By determining some point at which to begin letting the force trail off, predicting what the backside of the curve looks like, and allowing for some appropriate rebound velocity the final in-vehicle FDC can be estimated. The point at which the force starts trailing off is determined by when a certain amount of energy is absorbed. The backside of the curve could be estimated based on the backside curves of the vehicle baseline test impact and the component level test impact of the countermeasure. Several different predicted curves can be used to bracket the predicted, in-vehicle test impact. For example, by estimating the HIC(d) for a test impact with no rebound and for one with a 4 m/s (8 mph) rebound speed, the actual response can be bracketed. By experience, a test impact with a rebound speed outside this 4 m/s (8 mph) window is unlikely.

It is important to note that the method described for improving the energy absorption characteristics of automobile components as shown in the preferred and exemplary embodiments are illustrative only. Although only a few embodiments of the present invention has been disclosed in detail in this disclosure, those skilled in the art will readily appreciate that many modifications are possible (e.g. variations in countermeasure materials and structure, test devices and instrumentation, test and design criteria, applicable industry standards, etc.) without materially departing from the novel teachings and advantages of the subject matter recited in the claims. For example, the method of the invention may be used for a wide variation of material compositions and structures, various HIC(d) limitations, and industry testing standards such as FMH weight and speed. Accordingly, all such modifications are intended to included within the scope of this invention as defined in the appended claims. The order or sequence of any method steps may be varied or re-sequenced according to alternative embodiments. Other substitutions, modifications, changes and omissions may be made in the method of this invention described in the preferred and exemplary embodiments including but not limited to test criteria and related industry standards, operating and testing conditions, compilation, manipulation and presentation of test data, and selection and adjustment of countermeasure material and structure, etc. without departing from the spirit of this invention as expressed in the appended claims.

What is claimed is:

1. A method for designing an energy-absorbing impact zone for a vehicle interior, comprising:
   acquiring test data representative of an acceleration versus time relationship for a head of an occupant impacting the impact zone;
   determining a force versus deflection curve for the impact zone based on the test data;
   determining a total deflection of the energy-absorbing impact zone; and
   shaping the force versus deflection curve to minimize a deflection by selecting a countermeasure material having a thickness and adjusting the a stiffness of the material without exceeding a certain force limit and a certain head impact criterion.

2. The method of claim 1, wherein the force versus deflection curve represents data resulting from one or more dynamic head impact tests.

3. The method of claim 2, wherein the head impact criterion has an upper design limit of approximately 1000 hu.

4. The method of claim 2, wherein the dynamic head impact tests include a simulated human head traveling at a speed representative of approximately 6.7 meters per second.

5. The method of claim 2, wherein the dynamic head impact tests include a simulated human head traveling at a speed representative of a published automotive industry standard.

6. The method of claim 1, wherein the force versus deflection curve corresponds to a substantially constant amount of energy absorption representative of approximately 102 joules.

7. The method of claim 1, wherein the force versus deflection curve corresponds to a substantially constant amount of energy absorption corresponding to a simulated human head traveling at a speed representative of a published automotive industry standard.

8. The method of claim 1, wherein the force versus deflection curve is derived from an acceleration versus time curve.

9. The method of claim 8, wherein the force versus deflection curve is evaluated for one or more of an initial slope limit, a shape criteria, an energy absorption amount, a peak deflection criteria and a peak force criteria.

10. The method of claim 9, wherein the initial slope limit applies for generally linearly-ramping force versus deflection curves.

11. The method of claim 10, wherein the initial slope limit for the generally linearly-ramping or concave force versus deflection curve is within the range from 175 to 260 N/mm.

12. The method of claim 9, wherein the initial slope limit does not apply to force versus deflection curves having a trapezoidal shaped curve or a square shaped curve.

13. The method of claim 1, wherein the step of shaping the force versus deflection curve includes minimizing deflection.

14. The method of claim 1, wherein the force versus deflection curve has an upper force limit representative of approximately 6.2 kN.

15. The method of claim 1, further comprising the step of modeling the energy-absorbing impact zone as a group of springs in series, wherein the springs are representative of a vehicle sheet metal portion, a countermeasure and a free motion headform.

16. The method of claim 1, wherein adjusting the stiffness of the energy-absorbing impact zone includes changing one or more of the countermeasure material and the countermeasure structure.

17. The method of claim 16, wherein the countermeasure material is selected from the group consisting of metal, glass, ceramic, polymer, paper, cardboard, synthetic fiber and natural fiber.

18. The method of claim 17, wherein the countermeasure structure has a form selected from the group consisting of solid, solid with a void pattern, porous, foamed, honeycombed, wave-shaped, ribbed, woven, corrugated, compressed, composite and layered.

19. A method of designing a vehicle impact zone that reduces the severity of injury to an occupant during a collision, comprising:
   establishing a head impact criterion for quantitatively representing the severity of impact;
   selecting a design threshold for the impact criterion;
   conducting one or more dynamic impact tests;

using the dynamic impact test data to prepare one or more force versus deflection curves;

analyzing the force versus deflection curve data using a series spring analogy;

adjusting the stiffness of the impact zone;

shaping the force versus deflection curve without exceeding a certain force limit and the established head impact criterion.

20. The method of claim 19, wherein the dynamic impact tests include one or more dynamic head impact tests.

21. The method of claim 20, wherein the design threshold for the impact criterion has an upper limit of approximately 1000 hu.

22. The method of claim 20, wherein the dynamic head impact tests include a simulated human head traveling at a speed representative of approximately 6.7 meters per second.

23. The method of claim 20, wherein the dynamic head impact tests include a simulated human head traveling at a speed representative of a published automotive industry standard.

24. The method of claim 19, wherein the force versus deflection curves corresponds to a substantially constant amount of energy absorption representative of approximately 102 joules.

25. The method of claim 19, wherein the force versus deflection curve corresponds to a substantially constant amount of energy absorption corresponding to a simulated human head traveling at a speed representative of a published automotive industry standard.

26. The method of claim 19, wherein the force versus deflection curves are derived from one or more acceleration versus time curves.

27. The method of claim 26, wherein the force versus deflection curve is evaluated for one or more of an initial slope limit, a shape criteria, an energy absorption amount, a peak deflection criteria and a peak force criteria.

28. The method of claim 27, wherein the initial slope limit applies for generally linearly-ramping force versus deflection curves.

29. The method of claim 28, wherein the initial slope limit for the generally linearly-ramping force versus deflection curve is within the range from 175 to 260 N/mm.

30. The method of claim 27, wherein the initial slope limit does not apply to force versus deflection curves having a trapezoidal shaped curve or a square shaped curve.

31. The method of claim 19, wherein the step of shaping the force versus deflection curve includes minimizing deflection.

32. The method of claim 19, wherein the force versus deflection curves have an upper force limit representative of approximately 6.2 kN.

33. The method of claim 19, further comprising the step of modeling the energy-absorbing impact zone as a group of springs in series, the springs corresponding to a vehicle sheet metal portion, a countermeasure and a free motion headform.

34. The method of claim 19, wherein the step of adjusting the stiffness of the impact zone includes changing one or more of the countermeasure material and the countermeasure structure.

35. The method of claim 34, wherein the countermeasure material is selected from the group consisting of metal, glass, ceramic, polymer, paper, cardboard, synthetic fiber and natural fiber.

36. The method of claim 35, wherein the countermeasure structure has a form selected from the group consisting of solid, solid with a void pattern, porous, foamed, honeycombed, wave-shaped, ribbed, woven, corrugated, compressed, composite and layered.

37. A system for designing a countermeasure for an impact zone within a vehicle, comprising:

means for establishing a force versus deflection curve representing data from one or more impact tests between a free motion headform and the countermeasure;

means for establishing a head impact criterion;

means for analyzing the force versus deflection curve data using a series spring analogy;

means for shaping the force versus deflection curve to minimize deflection of the countermeasure based on the head impact criterion without exceeding a certain force limit.

38. The system of claim 37, wherein the head impact criterion is a maximum of approximately 1000 hu.

39. The system of claim 37, wherein the dynamic impact tests include a simulated human head traveling at a speed representative of approximately 6.7 meters per second.

40. The system of claim 37, wherein the countermeasure is tested using one or more of a static flat platen test, a dynamic flat platen test, a static round platen test, a dynamic round platen test, and a dynamic test using the free motion headform and the countermeasure, wherein the countermeasure is placed against a rigid background.

41. The system of claim 37, further comprising the step of selecting the countermeasure according to the countermeasure's packaging space, cost, and energy absorption and deflection properties.

42. A system for designing a countermeasure for a vehicle comprising:

means for acquiring test impact data representative of one or more impacts of an occupant against an interior component of the vehicle;

means for identifying design criteria for limiting injury to the occupant during an impact against the interior of the vehicle;

means for representing the test impact data in a force versus deflection relationship;

means for selecting a material for the countermeasure including a structure characteristic having an impact performance that satisfies the design criteria.

43. The system of claim 42 further comprising means for determining a packaging space within which the countermeasure may be provided.

44. The system of claim 42 further comprising means for determining a deflection of the interior component using a series spring model.

45. The system of claim 42 further comprising means for determining a total deflection at a certain force limit.

46. The system of claim 45 wherein the total deflection comprises a deflection budget for deflection of a headform and deflection of the countermeasure and deflection of a vehicle component.

47. The system of claim 45 further comprising means for determining a package space for the countermeasure based on the total deflection.

48. The system of claim 42 further comprising means for shaping a curve representative of the force versus deflection relationship in one of a convex shape and a trapezoidal shape.

49. The system of claim 42 further comprising means for converting flat platen-based material test data to reflect impact by a rounded headform.

50. The system of claim 42 further comprising means for determining an effective radius to account for a geometry of a vehicle component.

51. A system for designing a head impact countermeasure for a vehicle component comprising:
- means for developing a force versus deflection curve representative of an impact between a head form and the vehicle component;
- means for establishing a total deflection based on a certain force limit;
- means for determining a packaging space adjacent to the vehicle component within which the head impact countermeasure may be provided; and
- means for selecting a material for the head impact countermeasure.

52. The system of claim 51 further comprising means for transforming flat platen material test data for use with a rounded headform.

53. The system of claim 51 further comprising means for determining a structural shape of the material.

54. The system of claim 51 further comprising means for modeling the total deflection as a sum of individual springs.

55. The system of claim 51 further comprising means for shaping the force versus deflection curve to minimize deflection within a maximum force threshold.

56. The system of claim 51 further comprising means for selecting the material for the head impact countermeasure using a deflection budget.

57. The system of claim 51 further comprising means for selecting the material for the head impact countermeasure using an energy budget.

* * * * *